(12) United States Patent
Abe et al.

(10) Patent No.: US 12,420,433 B2
(45) Date of Patent: Sep. 23, 2025

(54) ROBOT HAND

(71) Applicant: SAMSUNG ELECTRONICS CO., LTD., Suwon-si (KR)

(72) Inventors: Yuki Abe, Yokohama (JP); Sungchul Kang, Suwon-si (KR); Takeshi Yamagishi, Yokohama (JP)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 944 days.

(21) Appl. No.: 17/561,160

(22) Filed: Dec. 23, 2021

(65) Prior Publication Data

US 2022/0203554 A1 Jun. 30, 2022

Related U.S. Application Data

(63) Continuation of application No. PCT/KR2021/019014, filed on Dec. 14, 2021.

(30) Foreign Application Priority Data

Dec. 24, 2020 (JP) ................................. 2020-215129

(51) Int. Cl.
*B25J 15/00* (2006.01)
*B25J 15/08* (2006.01)

(52) U.S. Cl.
CPC ....... *B25J 15/0009* (2013.01); *B25J 15/0028* (2013.01); *B25J 15/086* (2013.01)

(58) Field of Classification Search
CPC .. B25J 15/0009; B25J 15/0028; B25J 15/086; B25J 15/02; B25J 15/06; B25J 15/08;
(Continued)

(56) References Cited

U.S. PATENT DOCUMENTS 5,280,981 A * 1/1994 Schulz .................. B25J 13/082
901/34
5,762,390 A * 6/1998 Gosselin .............. B25J 15/0009
901/33
(Continued)

FOREIGN PATENT DOCUMENTS

CN 109202945 A 1/2019
CN 110682321 A 1/2020
(Continued)

OTHER PUBLICATIONS

International Search Report (PCT/ISA/210) issued Apr. 11, 2022 by the International Searching Authority in counterpart International Patent Application PCT/KR2021/019014.
(Continued)

*Primary Examiner* — Stephen A Vu
(74) *Attorney, Agent, or Firm* — Sughrue Mion, PLLC

(57) ABSTRACT

A robot hand is provided. The robot hand includes a first and second drive gears rotated by first actuator and second actuators; a first interlocked gear interlocked with the second drive gear to rotate in opposite directions; a second interlocked gear interlocked with the first drive gear to rotate in opposite directions; a first inner link engaged with rotation of the first drive gear; a first outer link engaged with rotation of the first interlocked gear; a first end link connected to the first inner link and the first outer link opposite the first actuator; a second inner link engaged with rotation of the second interlocked gear; a second outer link engaged with rotation of the second drive gear; and a second end link connected to the second inner link and the second outer link opposite the second actuator.

21 Claims, 22 Drawing Sheets

(58) Field of Classification Search
CPC ...... B25J 15/10; B25J 15/0213; B25J 15/022;
B25J 15/0616; B25J 9/1612; G05B
2219/39466; G05B 2219/39487; G05B
2219/40606; G05B 2219/40625
See application file for complete search history.

(56) References Cited

U.S. PATENT DOCUMENTS

| | | | |
|---|---|---|---|
| 6,505,870 B1 * | 1/2003 | Laliberte | B25J 15/0009 |
| | | | 901/31 |
| 8,827,337 B2 | 9/2014 | Murata et al. | |
| 10,016,901 B2 * | 7/2018 | Strauss | B25J 13/085 |
| 2010/0095799 A1 * | 4/2010 | Albin | B25J 15/0213 |
| | | | 901/31 |
| 2011/0241369 A1 | 10/2011 | Kamon et al. | |
| 2020/0316782 A1 | 10/2020 | Chavez et al. | |

FOREIGN PATENT DOCUMENTS

| | | |
|---|---|---|
| JP | WO2010/007795 A1 | 1/2010 |
| JP | 2012-40666 A | 3/2012 |
| JP | 2014-97546 A | 5/2014 |
| JP | 5590355 B2 | 9/2014 |
| JP | 2015-231652 A | 12/2015 |
| JP | WO2017/033885 A1 | 3/2017 |
| JP | 2021-154464 A | 10/2021 |
| JP | 2022-070311 A | 5/2022 |
| KR | 10-0660316 B1 | 12/2006 |
| KR | 10-1302957 B1 | 8/2013 |
| KR | 10-2018-0029607 A | 3/2018 |
| KR | 10-2020-0081303 A | 7/2020 |
| KR | 10-2183497 B1 | 11/2020 |
| WO | 2016/063314 A1 | 4/2016 |

OTHER PUBLICATIONS

Communication issued on Feb. 17, 2025 by the European Patent Office in European Patent Application No. 21911372.7.
Search Report issued on Dec. 20, 2023 by European Patent Office issued in European Application No. 21911372.7.

* cited by examiner

ROBOT HAND

CROSS-REFERENCE TO RELATED APPLICATION

This application is a bypass continuation of PCT International Application No. PCT/KR2021/019014, filed on Dec. 14, 2021, which is based on and claims priority to Japanese Patent Application No. 2020-215129, filed on Dec. 24, 2020, in the Japan Patent Office, the disclosure of which is incorporated by reference herein in its entirety.

BACKGROUND

1. Field

The disclosure relates to a robot hand.

2. Discussion of Related Art

A related robot hand includes a mechanism in which a gear on a first side operates two links on the first side, and a gear on a second side operates two links on the second side. However, the mechanism works to make the two links on the first side and the two links on the second side always operate in synchronization. Hence, the mechanism is unable to open or close the two links on the first side and the two links on the second side while synchronizing a link which connects the two links on the first side with a link connecting the two links on the second side.

SUMMARY

In accordance with an aspect to the disclosure, a robot hand is able to open or close two links on one side and two links on the other side while synchronously operating a link connecting the two links on the one side and a link connecting the two links on the other side.

In accordance with an aspect of the disclosure, a robot hand includes: a first drive gear on a first side configured to be rotated by a first actuator on the first side; a second drive gear on a second side configured to be rotated by a second actuator on the second side; a first interlocked gear on the first side interlocked with the second drive gear so that the first interlocked gear and the second drive gear rotate in opposite directions; a second interlocked gear on the second side interlocked with the first drive gear so that the second interlocked gear and the first drive gear rotate in opposite directions; a first inner link on the first side engaged with rotation of the first drive gear; a first outer link on the first side engaged with rotation of the first interlocked gear; a first end link on the first side connected to the first inner link and the first outer link opposite the first actuator; a second inner link on the second side engaged with rotation of the second interlocked gear; a second outer link on the second side engaged with rotation of the second drive gear; and a second end link on the second side connected to the second inner link and the second outer link opposite the second actuator.

The robot hand may further include a controller configured to: control the first inner link, the second inner link, the first outer link and the second outer link to perform an opening or closing operation by simultaneously operating the first actuator and the second actuator; and control the first outer link, the second outer link, the first end link and the second end link to be synchronously operated by deactivating the first actuator and actuating the second actuator.

The robot hand may further include a first finger portion on the first side connected to the first end link.

The first finger portion may extend away from the first inner link and the first outer link and be configured to bend inward toward the first inner link.

The first finger portion may include a stopper configured to grip an object.

The robot hand may further include a second finger portion on the second side connected to the second end link.

The second finger portion may include a blower configured to blow air towards an object fastened by the first finger portion.

The robot hand may further include a clipper arranged between the first finger portion and the second finger portion.

The second finger portion may be shorter than the first finger portion.

The robot hand may further include: a first adsorption portion on the first side arranged on the first finger portion; and a second adsorption portion on the second side arranged on the second finger portion.

The robot hand may further include a third adsorption portion arranged between the first finger portion and the second finger portion.

The robot hand may further include: any one or any combination of a first finger portion on the first side connected to the first end link or a second finger portion on the second side connected to the second end link; and any one or any combination of a first adsorption portion arranged on the first finger portion, a second adsorption portion arranged on the second finger portion, and a third adsorption portion arranged between the first finger portion and the second finger portion.

The robot hand may further include a controller configured to: recognize an object; identify whether a finger gripping method is stored in a memory in association with the object; control the first finger portion to grip the object when the finger gripping method is stored in the memory in association with the object; identify whether an adsorption gripping method is stored in the memory in association with the object; and control the first adsorption portion to grip the object when the adsorption gripping method is stored in the memory in association with the object.

The controller may be configured to: identify whether a combination gripping method is stored in the memory in association with the object; and control any one or any combination of the first finger portion or the second finger portion to grip the object in combination with any one or any combination of the first adsorption portion or the second adsorption portion when the combination gripping method is stored in the memory in association with the object.

The controller may be configured to: identify a gripping method is not stored in the memory in association with the object; control any one or any combination of an operation to grip the object with the first finger portion or an operation to grip the object with the first adsorption portion based on no method of gripping the object being stored in the memory in association with the object; register the finger gripping method in association with the object in the memory based on the operation to grip the object with the first finger portion being successful; and register the adsorption gripping method in association with the object in the memory based on the operation to grip the object with the first adsorption portion being successful.

In accordance with an aspect of the disclosure, a method of controlling a robot hand that includes a first actuator coupled to a first drive gear, a second actuator coupled to a second drive gear, a first interlocked gear interlocked with the second drive gear, and a second interlocked gear interlocked with the first drive gear is provided. The method includes: identifying a first object; positioning the robot hand with respect to the first object; controlling a first inner link coupled to the first drive gear, a second inner link coupled to the second drive gear, a first outer link coupled to the first interlocked gear and a second outer link coupled to the second interlocked gear to perform a closing operation with respect to the first object by simultaneously operating the first actuator and the second actuator; and controlling a first end link connected to the first inner link and the first outer link, and a second end link connected to the second inner link and the second outer link, to be synchronously operated to grip the first object by deactivating the first actuator and actuating the second actuator.

A first adsorption portion may be provided on a first finger portion connected to the first inner link and the first outer link, and a second adsorption portion may be provided on a second finger portion connected to the second inner link and the second outer link. The method may further include: identifying a second object; positioning the robot hand with respect to the second object; identifying a finger gripping method is not associated with the second object; identifying an adsorption gripping method is associated with the second object; and controlling the first adsorption portion and the second adsorption portion to grip the second object based on the adsorption gripping method being associated with the second object.

The method may further include: identifying a third object; positioning the robot hand with respect to the third object; identifying the finger gripping method is not associated with the third object; identifying the adsorption gripping method is not associated with the third object; identifying a combination gripping method is associated with the third object; and controlling the first end link and the second end link to be synchronously operated to grip the third object by deactivating the first actuator, actuating the second actuator, and activating the first adsorption portion and the second adsorption portion, based on the combination gripping method being associated with the third object.

The method may further include: identifying a fourth object; positioning the robot hand with respect to the fourth object; identifying the finger gripping method is not associated with the fourth object; identifying the adsorption gripping method is not associated with the fourth object; identifying the combination gripping method is not associated with the fourth object; controlling the first end link and the second end link to be synchronously operated to grip the fourth object by deactivating the first actuator and actuating the second actuator; and associating the fourth object with the finger gripping method based on the first end link and the second end link gripping the fourth object.

The method may further include: identifying a fifth object; positioning the robot hand with respect to the fifth object; identifying the finger gripping method is not associated with the fifth object; identifying the adsorption gripping method is not associated with the fifth object; identifying the combination gripping method is not associated with the fifth object; first attempting to grip the fifth object by controlling the first end link and the second end link to be synchronously operated to by deactivating the first actuator and actuating the second actuator; and identifying the first attempting as unsuccessful; second attempting to grip the fifth object by controlling the first adsorption portion and the second adsorption portion to grip the fifth object; and associating the fifth object with the adsorption gripping method based on the first adsorption portion and the second adsorption portion gripping the fifth object.

In accordance with an aspect of the disclosure, a non-transitory computer readable recording medium having embodied thereon a program, which when executed by a processor causes the processor to execute a method that controls a robot hand that includes a first actuator coupled to a first drive gear, a second actuator coupled to a second drive gear, a first interlocked gear interlocked with the second drive gear, and a second interlocked gear interlocked with the first drive gear, is provided. The method includes: identifying a first object; positioning the robot hand with respect to the first object; controlling a first inner link coupled to the first drive gear, a second inner link coupled to the second drive gear, a first outer link coupled to the first interlocked gear and a second outer link coupled to the second interlocked gear to perform a closing operation with respect to the first object by simultaneously operating the first actuator and the second actuator; and controlling a first end link connected to the first inner link and the first outer link, and a second end link connected to the second inner link and the second outer link, to be synchronously operated to grip the first object by deactivating the first actuator and actuating the second actuator.

BRIEF DESCRIPTION OF THE DRAWINGS

The above and other aspects, features and advantages of certain embodiments will become more apparent from the following description taken in conjunction with the accompanying drawings, in which.

DETAILED DESCRIPTION

Figure 1:
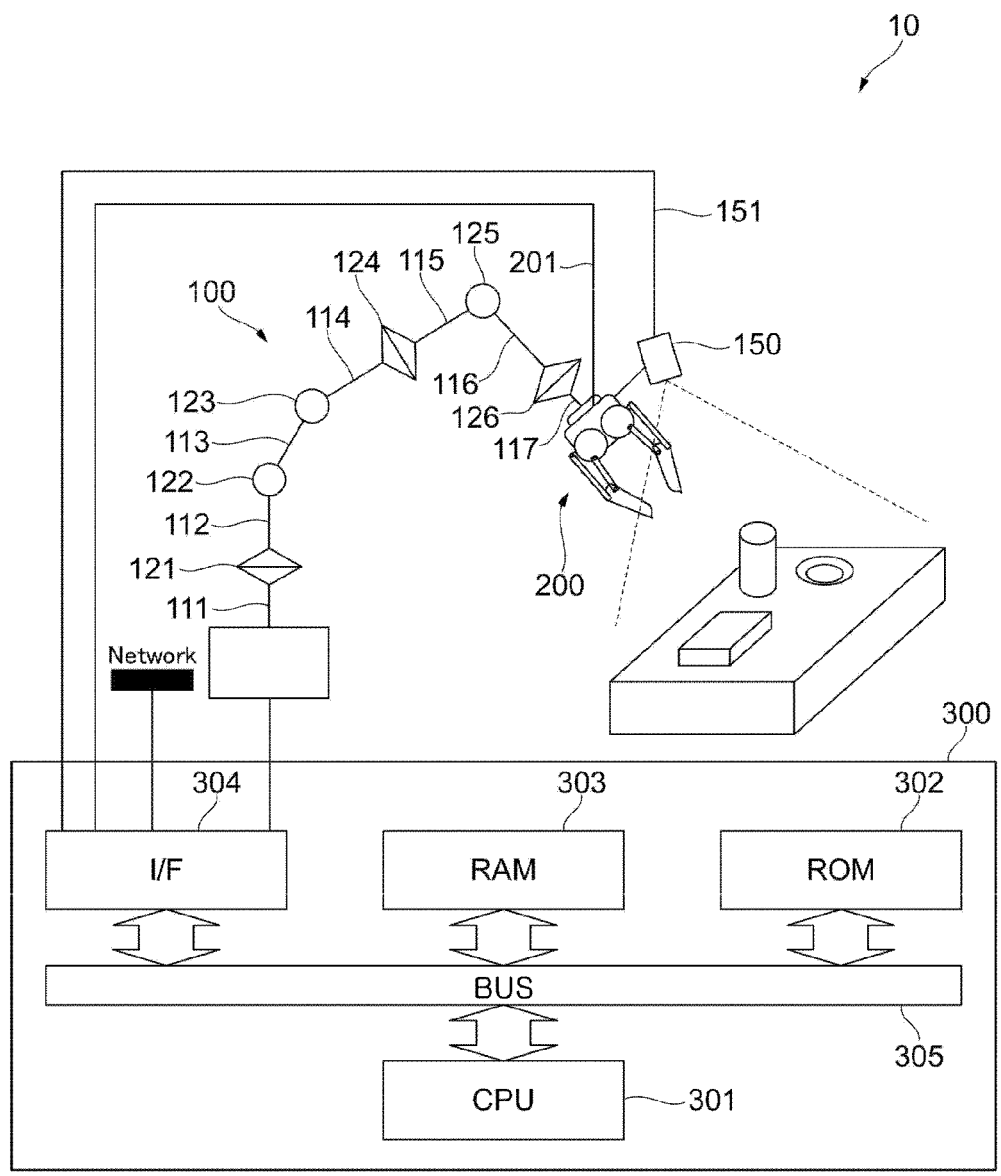
FIG. 1 illustrates a configuration of a robot, according to an embodiment.

Various embodiments will be described more fully hereinafter with reference to the accompanying drawings. In the drawings, like numerals refer to like elements throughout. As used herein, the terms "1st" or "first" and "2nd" or "second" may use corresponding component regardless of importance or order and are used to distinguish a component from another without limiting the components. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

FIG. 1 illustrates a configuration of a robot 10, according to an embodiment. The robot 10 includes an arm part 100, a three-dimensional (3D) information acquirer 150, an interface cable 151, a hand part 200, an interface cable 201, and a controller 300.

The arm part 100 positions the hand part 200. The arm part 100 may include, but is not exclusive to, links 111 to 117 and joints 121 to 126. The links 111 to 117 are parts corresponding to a lower arm, upper arm, wrist, and the like. The joints 121 to 126 are parts corresponding to joints, and each of the joints 121 to 126 connects between neighboring links so that the links are rotatable in at least one direction. In FIG. 1, each of the joints 121 to 126 allows its neighboring link to be able to rotate as follows, without being limited thereto. The joint 121 allows the link 112 to be able to rotate against the link 111 around a center axis of the link 111. The joint 122 allows the link 113 to be able to rotate against the link 112 around an axis perpendicular to a plane including the links 112 and 113. Similar to the joint 122, the joint 123 allows the link 114 to be able to rotate against the link 113 and the joint 125 allows the link 116 to be rotated against the link 115. Similar to the joint 121, the joint 124 allows the link 115 to be able to rotate against the link 114 and the joint 126 allows the link 117 to be rotated against the link 116.

The 3D information acquirer 150 is a device arranged e.g., at the hand part 200, and is used for acquiring 3D information within a range enclosed by dotted lines in a radial direction of a fan shape. The 3D information refers to information indicating of a group of dots on the contour of an object in the range. The 3D information acquirer 150 may be any device that is able to acquire the 3D information. For example, the 3D information acquirer 150 may be a 3D camera or a sensor using e.g., ultrasound.

The interface cable 151 is a cable for transmitting the 3D information from the 3D information acquirer 150 to the controller 300.

The hand part 200 is for performing an actual operation depending on the purpose of the robot 10. The hand part 200 is installed at a front end of the arm part 100. Details of the hand part 200 will be described later.

The interface cable 201 is a cable for transmitting an operation instruction to the hand part 200 from the controller 300 or transmitting various sensor signals, which will be described later, to the controller 300 from the hand part 200.

The controller 300 controls the whole robot 10. The controller 300 includes a central processing unit (CPU) 301, a read-only memory (ROM) 302, a random access memory (RAM) 303, and an interface (I/F) 304, which are interconnected via a bus 305. The CPU 301 provides various functions, as will be described later, by loading various programs stored in the ROM 302 into the RAM 303 and executing the programs. The ROM 302 is a memory for storing various programs to be executed by the CPU 301. The RAM 303 is a memory used as e.g., a task memory of the CPU 301. The I/F 304 transmits or receives various information to or from the 3D information acquirer 150 through the interface cable 151 and to or from the hand part 200 through the interface cable 201. Furthermore, the I/F 304 transmits or receives various information to or from the arm part 100, and to or from a network.

Figure 2:
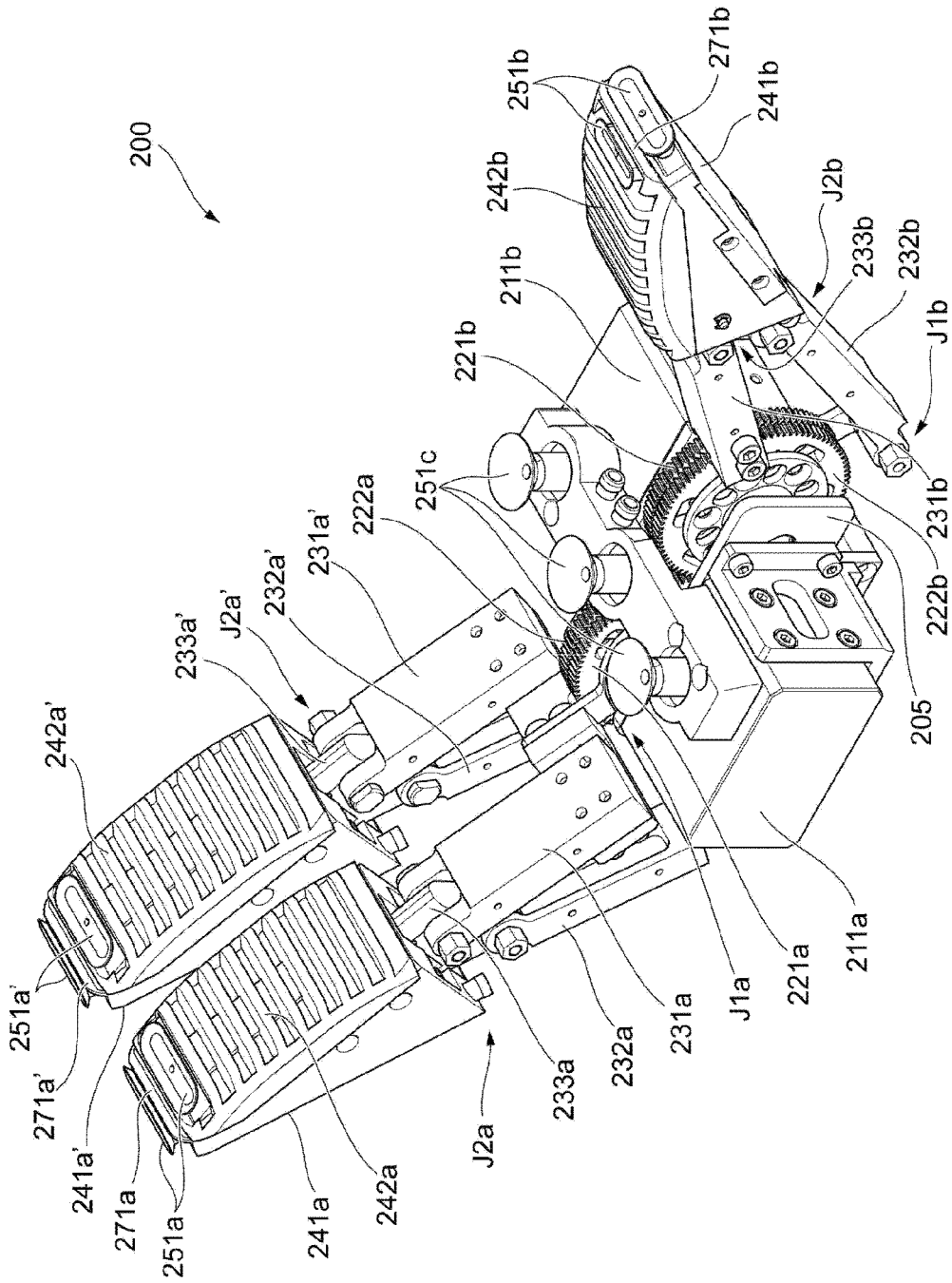
FIG. 2 is a perspective view of a hand part a robot, according to an embodiment.

FIG. 2 is a perspective view of the hand part 200 of the robot 10, according to an embodiment. Herein, "left side" and "right side" refer to the left side and the right side, respectively, in the drawings. Depending on the viewing position, the left side may look like a front side and the right side may look like a rear side, or the left side may look like a right side and the right side may look like a left side, or the left side may look like a rear side and the right side may look like a front side, so the left side is taken as an example of one side and the right side is an example of the other side.

As illustrated, the hand part 200 includes a base 205. The base 205 is a base part of the hand part 200.

The hand part 200 includes motors 211a and 211b. The motor 211a is a power source arranged on the left of the base 205. The motor 211b is a power source arranged on the right of the base 205. The motor 211a is an example of an actuator on one side, and the motor 211b is an example of an actuator on the other side. The motors 211a and 211b may be collectively called a motor 211.

The hand part 200 includes first gears 221a and 221b. The first gear 221a is arranged on the left side of the base 205, is coupled to the motor 211a, and is rotated when the motor 211a is rotated. The first gear 221b is arranged on the right side of the base 205, is coupled to the motor 211b, and is rotated when the motor 211b is rotated. The first gear 221a is an example of a first gear on one side and the first gear 221b is an example of a first gear on the other side. The first gears 221a and 221b may be collectively called a first gear 221.

The hand part 200 includes second gears 222a and 222b. The second gear 222a is arranged on the left side of the base 205, is interlocked with the first gear 221b, and when the first gear 221b is rotated, the second gear 222a is rotated in the opposite direction. The second gear 222b is arranged on the right side of the base 205, is interlocked with the first gear 221a, and when the first gear 221a is rotated, the second gear 222b is rotated in the opposite direction. The second gear 222a is an example of a second gear on one side and the second gear 222b is an example of a second gear on the other side. The second gears 222a and 222b may be collectively called a second gear 222.

The first gear 221a and the second gear 222a constitute a first joint J1a, and the first gear 221b and the second gear 222b constitute a first joint J1b. The first joints J1a and J1b may be collectively called a first joint J1. For example, a rotation axis of the motor 211a may correspond to a rotation axis of the first gear 221a and a rotation axis of the second gear 222a. For example, a rotation axis of the motor 211b may correspond to a rotation axis of the first gear 221b and a rotation axis of the second gear 222b.

The hand part 200 includes first links 231a, 231a' and 231b. The first links 231a, 231a' and 231b are inner links of the fingers. The first links 231a and 231a' are connected to the first gear 221a and moved in a direction of opening or closing the fingers as the first gear 221a is rotated. The first link 231a and the first link 231a' are integrated into a rigid body. The first link 231b is connected to the second gear 222b and moved in a direction of opening or closing the finger as the second gear 222b is rotated. The first links 231a and 231a' are an example of first links on one side and the first link 231b is an example of a first link on the other side. The first links 231a, 231a' and 231b may be collectively called a first link 231.

The hand part 200 includes second links 232a, 232a' and 232b. The second links 232a, 232a' and 232b are outer links of the fingers. The second links 232a and 232a' are connected to the second gear 222a and moved in a direction of opening or closing the fingers as the second gear 222a is rotated. The second link 232a and the second link 232a' are integrated into a rigid body. The second link 232b is connected to the first gear 221b and moved in a direction of opening or closing the finger as the first gear 221b is rotated. The second links 232a and 232a' are an example of second links on one side and the second link 232b is an example of a second link on the other side. The second links 232a, 232a' and 232b may be collectively called a second link 232.

The hand part 200 includes third links 233a, 233a' and 233b. The third links 233a, 233a' and 233b are links connecting the inner links and the outer links of the fingers. The third link 233a connects an end of the first link 231a that is not connected to the first gear 221a to an end of the second link 232a that is not connected to the second gear 222a. The third link 233a' connects an end of the first link 231a' that is not connected to the first gear 221a to an end of the second link 232a' that is not connected to the second gear 222a. The third link 233b connects an end of the first link 231b that is not connected to the first gear 221b to an end of the second link 232b that not connected to the second gear 222b. The third links 233a and 233a' are an example of third links on one side and the third link 233b is an example of a third link on the other side. The third links 233a, 233a' and 233b may be collectively called a third link 233.

A part where the first link 231a, the second link 232a and the third link 233a are connected forms the second joint J2a. A part where the first link 231a', the second link 232a' and the third link 233a' are connected forms the second joint J2a'. A part where the first link 231b, the second link 232b and the third link 233b are connected forms the second joint J2b. The second joints J2a, J2a' and J2b may be collectively called a second joint J2.

Figure 3:
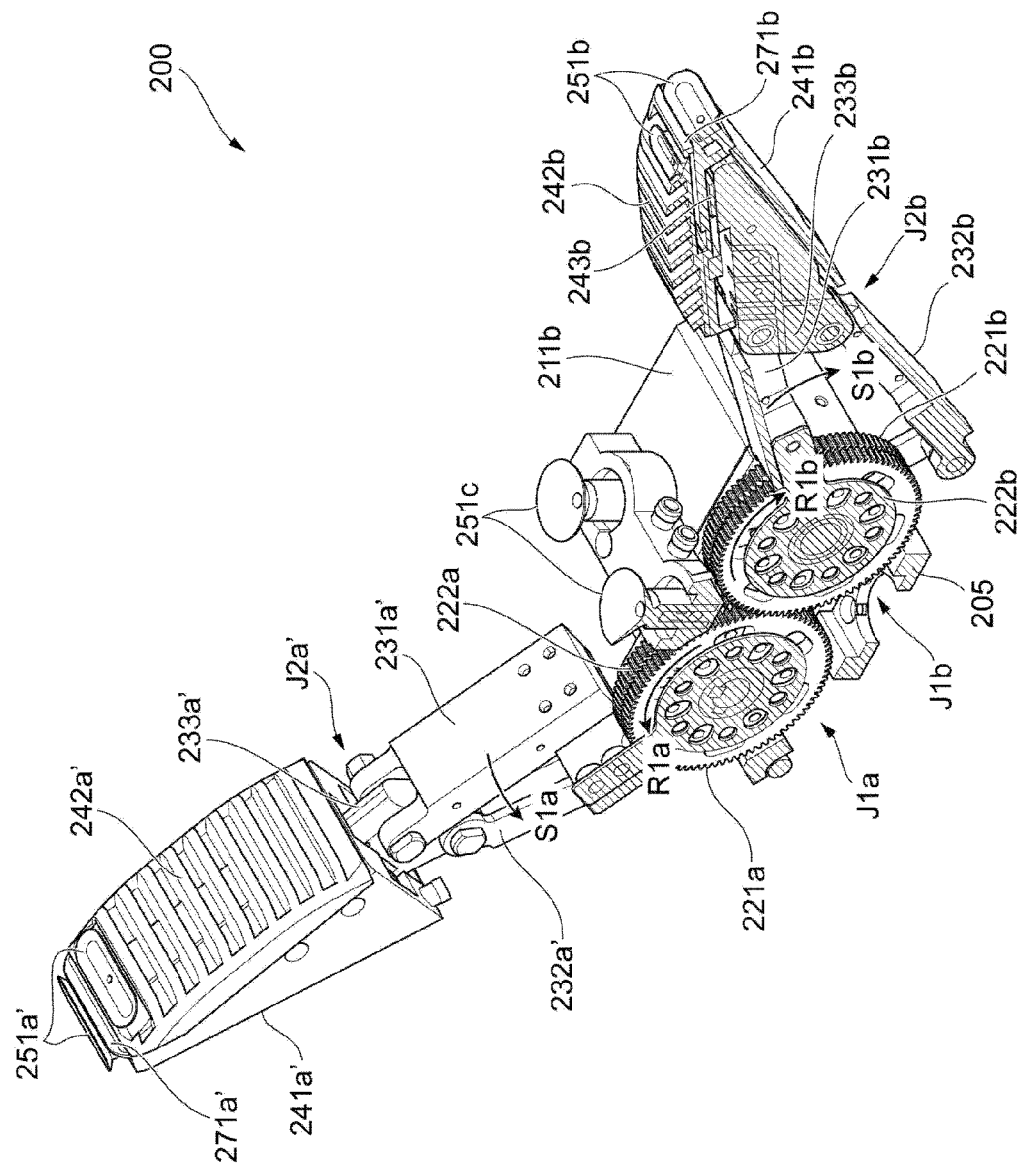
FIG. 3 is a perspective view illustrating a cross-section of the hand part of FIG. 2.
Figure 4:
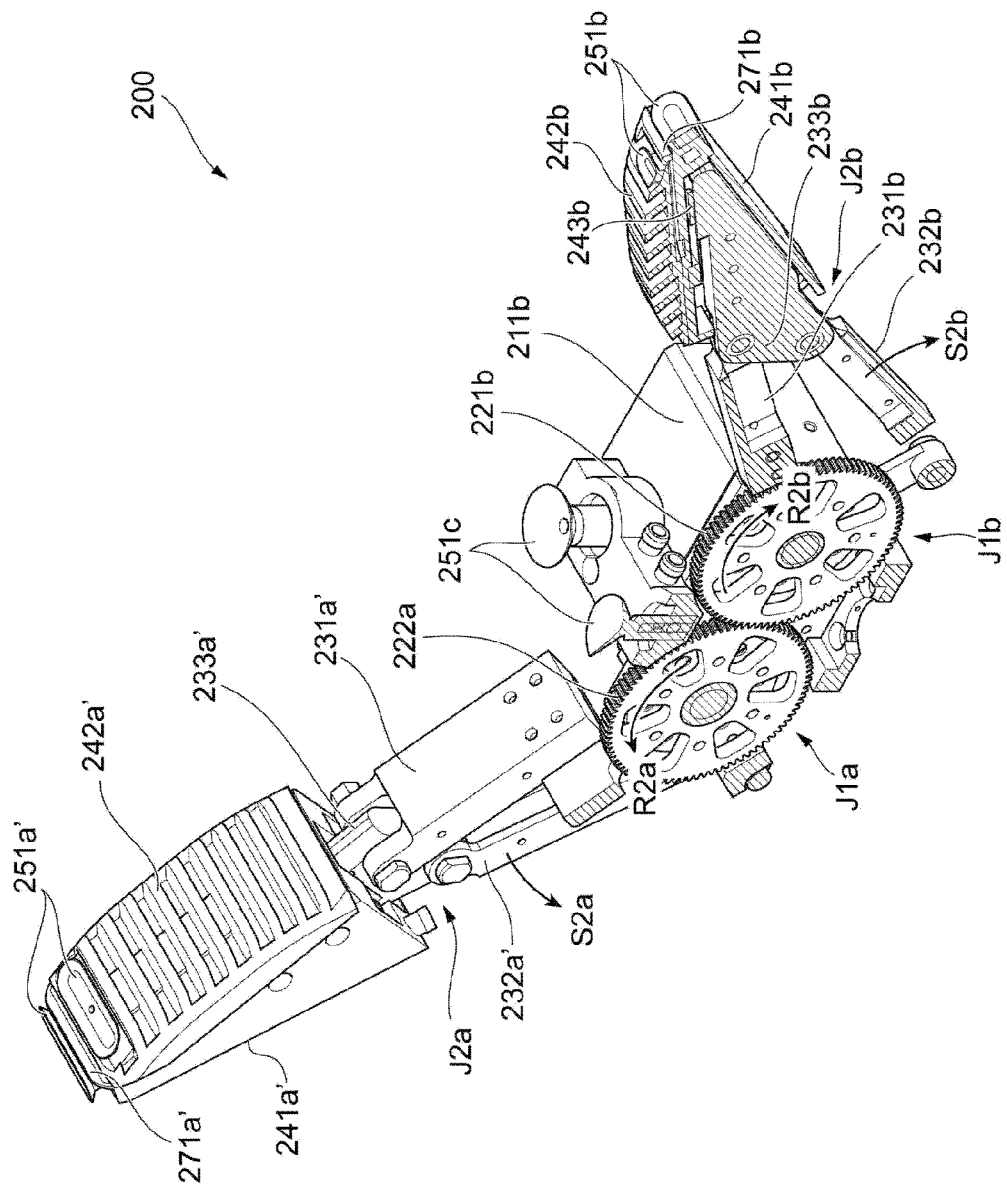
FIG. 4 is a perspective view illustrating a cross-section of the hand part of FIG. 2.

FIG. 3 is a perspective view illustrating a cross-section obtained by cutting the hand part 200 of FIG. 2 in a plane including the first gear 221a and the second gear 222b. FIG. 4 is a perspective view illustrating a cross-section obtained by cutting the hand part 200 of FIG. 2 in a plane including the first gear 221b and the second gear 222a.

Referring to FIGS. 2 to 4, operations of the motors 211a and 211b to rotate the first links 231a, 231a' and 231b, the second links 232a, 232a' and 232b, and the third links 233a, 233a' and 233b will now be described.

An operation to rotate the first links 231a, 231a' and 231b will be described first.

In this case, the motor 211a is driven to be rotated. Accordingly, the first gear 221a coupled to the motor 211a is rotated as shown by an arrow R1a of FIG. 3. The first link 231a' connected to the first gear 221a is then rotated as shown by an arrow S1a of FIG. 3. Furthermore, as the first link 231a is fixed to the first link 231a', the first link 231a is rotated simultaneously with the first link 231a'.

When the first gear 221a is rotated, the second gear 222b interlocked with the first gear 221a is rotated as shown by an arrow R1b of FIG. 3. The first link 231b connected to the second gear 222b is then rotated as shown by an arrow S1b of FIG. 3.

In this way, when the motor 211a is rotated, the associated first links 231a and 231a' are rotated around the rotation axis of the motor 211a, and the first link 231b is rotated around the rotation axis of the motor 211b by the same angle in the opposite direction of the first links 231a and 231a'.

Next, an operation to rotate the second links 232a, 232a' and 232b will be described.

In this case, the motor 211b is driven to be rotated. Accordingly, the first gear 221b coupled to the motor 211b is rotated as shown by an arrow R2b of FIG. 4. The second link 232b connected to the first gear 221b is then rotated as shown by an arrow S2b of FIG. 4. In FIG. 4, although the second link 232b is actually connected to the first gear 221b, the second link 232b does not look like it is connected to the first gear 221b in the cutting plane.

When the first gear 221b is rotated, the second gear 222a interlocked with the first gear 221b is rotated as shown by an arrow R2a of FIG. 4. The second link 232a' connected to the second gear 222a is then rotated as shown by an arrow S2a of FIG. 4. Furthermore, as the second link 232a is fixed to the second link 232a', the second link 232a is also rotated simultaneously.

In this way, when the motor 211b is rotated, the associated second link 232b is rotated around the rotation axis of the motor 211b, and the second links 232a and 232a' are rotated around the rotation axis of the motor 211a by the same angle in the opposite direction of the second link 232b.

Next, an operation to rotate the third links 233a, 233a' and 233b will be described.

In this case, for example, the motor 211a is stopped and the motor 211b is rotated. Accordingly, the first gear 221b coupled to the motor 211b and the second link 232b connected to the first gear 221b are rotated.

The second gear 222a interlocked with the first gear 221b is rotated, and the second link 232a' connected to the second gear 222a is rotated. Furthermore, as the second link 232a is fixed to the second link 232a', the second link 232a is rotated simultaneously with the second link 232a'.

In this way, when the motor 211b is rotated, the associated second link 232b is rotated around the rotation axis of the motor 211b, and the second links 232a and 232a' are rotated around the rotation axis of the motor 211a by the same angle in the opposite direction of the second link 232b. However, as rotation of the motor 211a is suspended and the first links 231a, 231a' and 231b are not moved, the third links 233a, 233a' and 233b work together and are rotated around the second joint J2 of the respective fingers. That is, the third links 233a, 233a' and 233b are synchronized and operated to be bent inwards.

Specifically, when the motor 211a and the motor 211b are simultaneously driven to rotate by the same angle, the first joints J1 of three fingers are rotated at the same time, and when the motor 211a is stopped and the motor 211b is rotated, only the second joints J2 of the three fingers are simultaneously rotated. With a combination of these motions, the first joint J1 and the second joint J2 may be rotated by an arbitrary angle by engaging the three fingers with each other.

Although the first gear 221 and the second gear 222 are directly interlocked together herein, the disclosure is not limited thereto. For example, the first gear 221 and the second gear 222 may be engaged to rotate in opposite directions.

For example, a first middle gear and a second middle gear are provided in sequence from the side of the first gear 221 to the side of the second gear 222, and the first gear 221 and the second gear 222 may be engaged through the middle gears.

In this regard, as a first example, the first gear 221 and the first middle gear may be connected by a chain, the first middle gear and the second middle gear may be directly interlocked, and the second gear 222 and the second middle gear may be connected by a chain.

As a second example, the first gear 221 and the first middle gear, the first middle gear and the second middle gear, and the second middle gear and the second gear 222 may each be directly interlocked.

Turning back to FIGS. 2 to 4, description of the structure of the hand part 200 will be continued.

The hand part 200 includes finger parts 241a, 241a' and 241b, finger belly parts 242a, 242a' and 242b, and tactile sensors 243a, 243a' and 243b.

The finger parts 241a, 241a' and 241b are coupled to the third links 233a, 233a' and 233b, respectively, and are parts corresponding to fingers. The finger parts 241a and 241a' are an example of finger parts on one side, and the finger part 241b is an example of a finger part on the other side. The finger parts 241a, 241a' and 241b may be collectively called a finger part 241. Although the finger parts 241a, 241a' and 241b are provided in this example, at least one of them may be provided. In this sense, the finger part 241 may be understood as an example of at least one of the finger part on the one side coupled to the third link on the one side or the finger part on the other side coupled to the third link on the other side.

The finger belly parts 242a, 242a' and 242b are installed on inner sides of the finger parts 241a, 241a' and 241b, respectively, and are parts corresponding to the belly of the finger. The finger belly parts 242a, 242a' and 242b may be formed of e.g., an elastic and soft material. The finger belly parts 242a, 242a' and 242b may be collectively called a finger belly part 242.

The tactile sensors 243a, 243a' and 243b are arranged in the finger parts 241a, 241a' and 241b, respectively. The tactile sensors 243a, 243a' and 243b detect a grip of an object with the finger parts 241a, 241a' and 241b, respectively. Specifically, when the finger parts 241a, 241a' and 241b grip an object, the object may cause the finger belly parts 242a, 242a' and 242b to rotate by a small angle and contact with the tactile sensors 243a, 243a' and 243b, and accordingly, the grip may be detected based on the contact. The tactile sensors 243a, 243a' and 243b may be collectively called a tactile sensor 243. Alternatively, a force or torque sensor may be provided instead of the tactile sensor 243. Alternatively, instead of the tactile sensor 243, a current sensor may be provided to perform the detection through torque sensing.

Furthermore, the hand part 200 includes adsorption pads 251a, 251a' and 251b and adsorption pumps 252a, 252a' and 252b.

The adsorption pads 251a, 251a' and 251b are mounted on the finger part 241a and the finger belly part 242a, the finger part 241a' and the finger belly part 242a', and the finger part 241b and the finger belly part 242b, respectively. The adsorption pads 251a, 251a' and 251b are to grip an object by adsorbing the object with the finger part 241a and the finger belly part 242a, the finger part 241a' and the finger belly part 242a', and the finger part 241b and the finger belly part 242b, respectively. For example, it is possible to put a nameplate into a card wallet with the adsorption pads 251a and 251a' adsorbing and raising an edge of the name plate and the adsorption pad 251b gripping the nameplate by adsorbing the edge to hold it on the other side. In another example, it is possible to smooth wrinkles of cloth or paper by adsorbing an edge of the cloth or paper with the adsorption pads 251a and 251a', adsorbing the other edge of the cloth or paper with the adsorption pad 251b, and spread the finger parts 241a and 241a' and the finger part 241b. The adsorption pads 251a, 251a' and 251b are detachable, so the positions of the adsorption pads 251a, 251a' and 251b in the drawings are merely an example, and the adsorption pads 251a, 251a' and 251b may be installed anywhere on the finger parts 241a, 241a' and 241b or the finger belly parts 242a, 242a' and 242b. The adsorption pads 251a and 251a' are an example of adsorption parts on one side, and the adsorption pad 251b is an example of an adsorption part on the other side. Alternatively, the finger belly parts 242a, 242a' and 242b may serve as jamming transition epidermis instead of installing the adsorption pads 251a, 251a' and 251b on the finger belly parts 242a, 242a' and 242b, so that the finger belly parts 242a, 242a' and 242b may grip an object. In this case, the finger parts 242a and 242a' are an example of the adsorption parts on one side, and the finger belly part 242b is an example of the adsorption part on the other side.

Adsorption pads 251c are arranged on the top surface of the base 205, i.e., a portion of a palm in terms of a hand, in the middle between the finger parts 241a and 241a' and the finger part 241b. The adsorption pads 251c are for gripping an object by adsorbing the object in a state in which the fingers are spread apart from each other. The adsorption pads 251c are an example of middle adsorption parts.

The adsorption pads 251a, 251a' and 251b may be collectively called an adsorption pad 251. Although the adsorption pads 251a, 251a' and 251b are shown, additional adsorption pads or fewer adsorption pads may be provided. In this case, it may be understood that the adsorption pad 251 is an example of at least one of the adsorption part on one side arranged on the finger part on the one side, the adsorption part on the other side arranged on the finger part on the other side, or the middle adsorption part arranged in the middle between the finger part on the one side and the finger part on the other side.

The adsorption pumps 252a, 252a' and 252b are provided in the finger parts 241a, 241a' and 241b, and are connected to the adsorption pads 251a, 251a' and 251b through adsorption conduits. Adsorption pumps 252c are arranged in the base 205 and are connected to the adsorption pads 251c through adsorption conduits. The adsorption pumps 252a, 252a', 252b, and 252c allow the adsorption pads 251a, 251a' 251b and 251c to adsorb an object by vacuuming air from the inside of the adsorption pads, respectively. The positions at which the adsorption pumps 252a, 252a', 252b and 252c are installed are an example. The adsorption pumps 252a, 252a', 252b and 252c may all be arranged in the base 205. The adsorption pumps 252a, 252a' 252b and 252c may be collectively called an adsorption pump 252.

Although three adsorption pads are provided as the adsorption pad 251c in the above example, the disclosure is not limited thereto. For example, there may be one adsorption pad, and the one adsorption pad may correspond to a size the three adsorption pads.

Furthermore, the hand part 200 includes pressure sensors 261a, 261a', 261b, and 261c. The pressure sensors 261a, 261a' and 261b are connected to adsorption conduits in the finger parts 241a, 241a' and 241b, respectively. The pressure sensor 261c is connected to an adsorption conduit in the base 205. The pressure sensors 261a, 261a' and 261b detect pressure in the adsorption conduit between the adsorption pad 251a and the adsorption pump 252a, the adsorption conduit between the adsorption pad 251a' and the adsorption pump 252a', and the adsorption conduit between the adsorption pad 251b and the adsorption pump 252b, respectively. The pressure sensor 261c detects pressure in the adsorption conduit between the adsorption pad 251c and the adsorption pump 252c. The positions at which the pressure sensors 261a, 261a', 261b and 261c are installed are an example. For example, in the case that the adsorption pumps 252a, 252a', 252b and 252c are all arranged in the base 205, all the pressure sensors 261a, 261a', 261b and 261c may be arranged in the base 205. The pressure sensors 261a, 261a', 261b, and 261c may be collectively called a pressure sensor 261.

Furthermore, the hand part 200 includes nail parts 271a, 271a' and 271b. The nail parts 271a, 271a' and 271b are arranged at ends (front ends) of the finger parts 241a, 241a' and 241b, respectively. The nail parts 271a, 271a' and 271b are to grip an object by picking up the object that is hard to grip only with the finger parts 241a, 241a' and 241b, respectively. For example, when a thin plate lies on the floor, it may be picked up by the nail parts 271a and 271a' and the nail part 271b on both sides. In another example, a desired book of books packed in a bookshelf may be taken out by the nail parts 271a and 271a' and the nail part 271b on both sides. The nail parts 271a, 271a' and 271b may be collectively called a nail part 271.

The hand part 200 employs a structure in which the finger parts 241a and 241a' are able to rotate separately around their own central axes as rotation axes.

Furthermore, although the hand part 200 has the first joint J1 and the second joint J2 provided at each finger part, there may be three or more joints arranged at each finger part.

In addition, although the hand part 200 has two finger parts on one side and a finger part on the other side, embodiments are not limited thereto. For example, one finger part on each of the one side and the other side may be provided, or two finger parts on each of the one side and the other side may be provided.

Figure 5:
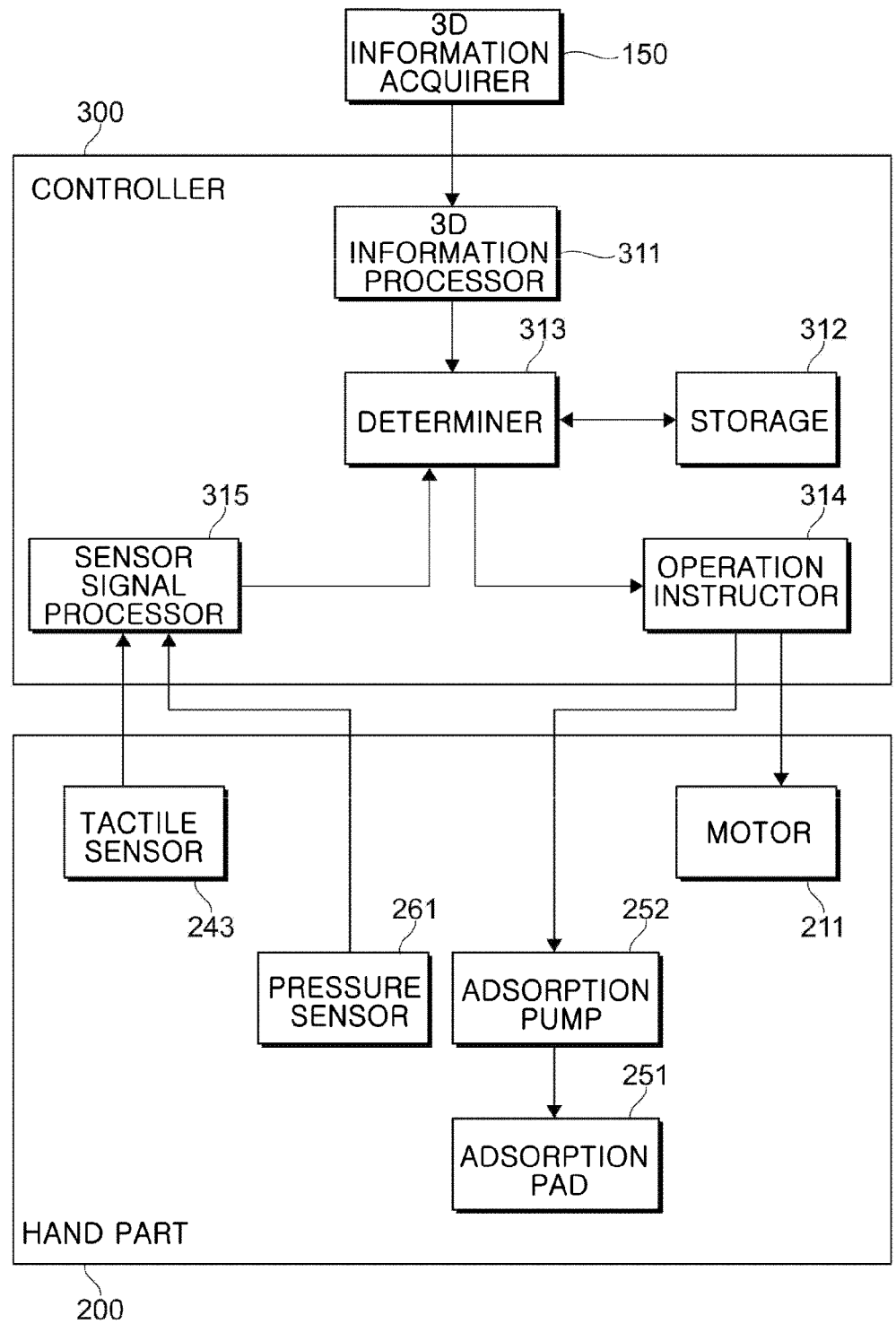
FIG. 5 is a block diagram illustrating a controller of a robot, according to an embodiment.

FIG. 5 is a block diagram illustrating the 3D information acquirer 160, the hand part 200, and the controller 300 of the robot 10, according to an embodiment.

As shown, the controller 300 of the robot 10 according to an embodiment includes various hardware components, including a 3D information processor 311, a storage 312, a determiner 313, an operation instructor 314, and a sensor signal processor 315.

The 3D information processor 311 receives and processes 3D information from the 3D information acquirer 150. As described above, the 3D information refers to information indicating a group of dots on the contour of an object in space. The 3D information processor 311 recognizes an object present in the space from the information indicating the group of dots. Furthermore, the 3D information processor 311 specifies a position of the object recognized from the information indicating the group of dots. In this case, the position may be e.g., a relative position of the object to the 3D information acquirer 150. As an example of a component for recognizing an object, the 3D information processor 311 is provided.

The storage 312 stores information indicating a correspondence between a type of the object and a method of gripping the object. The method of gripping the object may include e.g., a method of gripping the object with the finger part 241, a method of gripping the object with the adsorption pad 251, and a method of gripping the object with a complex operation using both the finger part 241 and the adsorption pad 251.

When information indicating a method of gripping the object recognized by the 3D information processor 311 is stored in the storage 312, the determiner 313 specifies the method associated with the object as a method of gripping the object. The determiner 313 informs the operation instructor 314 of the specified method.

When information indicating a method of gripping the object recognized by the 3D information processor 311 is not stored in the storage 312, the determiner 313 sends corresponding information to the operation instructor 314. The determiner 313 then specifies a method that has succeeded in gripping the object (or a similar object) based on the sensor signal acquired from the sensor signal processor 315, and stores information indicating the method in the storage 312 as a method of gripping the object. For example, the determiner 313 is provided as an example of a component (i.e., a hardware component) for registering a method of gripping an object.

When information indicating a method of gripping the object stored in the storage 312 is informed to the operation instructor 314 from the determiner 313, the operation instructor 314 controls the hand part 200 to grip the object in the gripping method. For example, when receiving information indicating a method of gripping the object with the finger part 241 from the determiner 313 as the method of gripping the object, the operation instructor 314 instructs the motor 211 to perform an operation of opening or closing the first link 231 and the second link 232, and an operation of bending the third link 233 inward. In another example, when receiving information indicating a method of gripping the object with the adsorption pad 251 as the method of gripping the object from the determiner 313, the operation instructor 314 instructs the adsorption pump 252 to vacuum air of the inside of the adsorption pad 251. In still another example, when receiving information indicating a method of gripping the object with a complex operation using both the finger part 241 and the adsorption pad 251 as a method of gripping the object from the determiner 313, the operation instructor 314 controls both the motor 211 and the adsorption pump 252 to perform both gripping and adsorption. The operation instructor 314 is provided as an example of a component for controlling the object to be gripped by one or both of the finger part and the adsorption part.

When receiving information indicating a method of gripping the object is not stored in the storage 312 from the determiner 313, the operation instructor 314 controls the hand part 200 to perform at least one of the operation of gripping the object with the finger part 241 or the operation of gripping the object with the adsorption pad 251. For example, in the case of performing the operation of gripping the object with the finger part 241, the operation instructor 314 instructs the motor 211 to perform an operation of opening or closing the first link 231 and the second link 232 and an operation of bending the third link 233 inward. In another example, in the case of performing the operation of gripping the object with the adsorption pad 251, the operation instructor 314 instructs the adsorption pump 252 to vacuum air of the inside of the adsorption pad 251. In still another example, in the case of performing the operation of gripping the object with a complex operation using both the finger part 241 and the adsorption pad 251, the operation instructor 314 controls the motor 211 and the adsorption pump 252 to perform the both operations. The operation instructor 314 is provided as an example of a component for controlling at least one of the operation of gripping the object with the finger part or the operation of gripping the object with the adsorption part to be performed.

The sensor signal processor 315 may be provided by the tactile sensor 243 a sensor signal that represents a result of gripping the object with the finger part 241 performed under the instruction to the motor 211 from the operation instructor 314. Furthermore, the sensor signal processor 315 may obtain be provided by the pressure sensor 261 a sensor signal that represents a result of gripping the object with the adsorption pad 251 performed under the instruction from the operation instructor 314 to the adsorption pump 252. As an example of a component for controlling to detect that a grip of an object has been successful, the sensor signal processor 314 is provided.

Figure 6A:
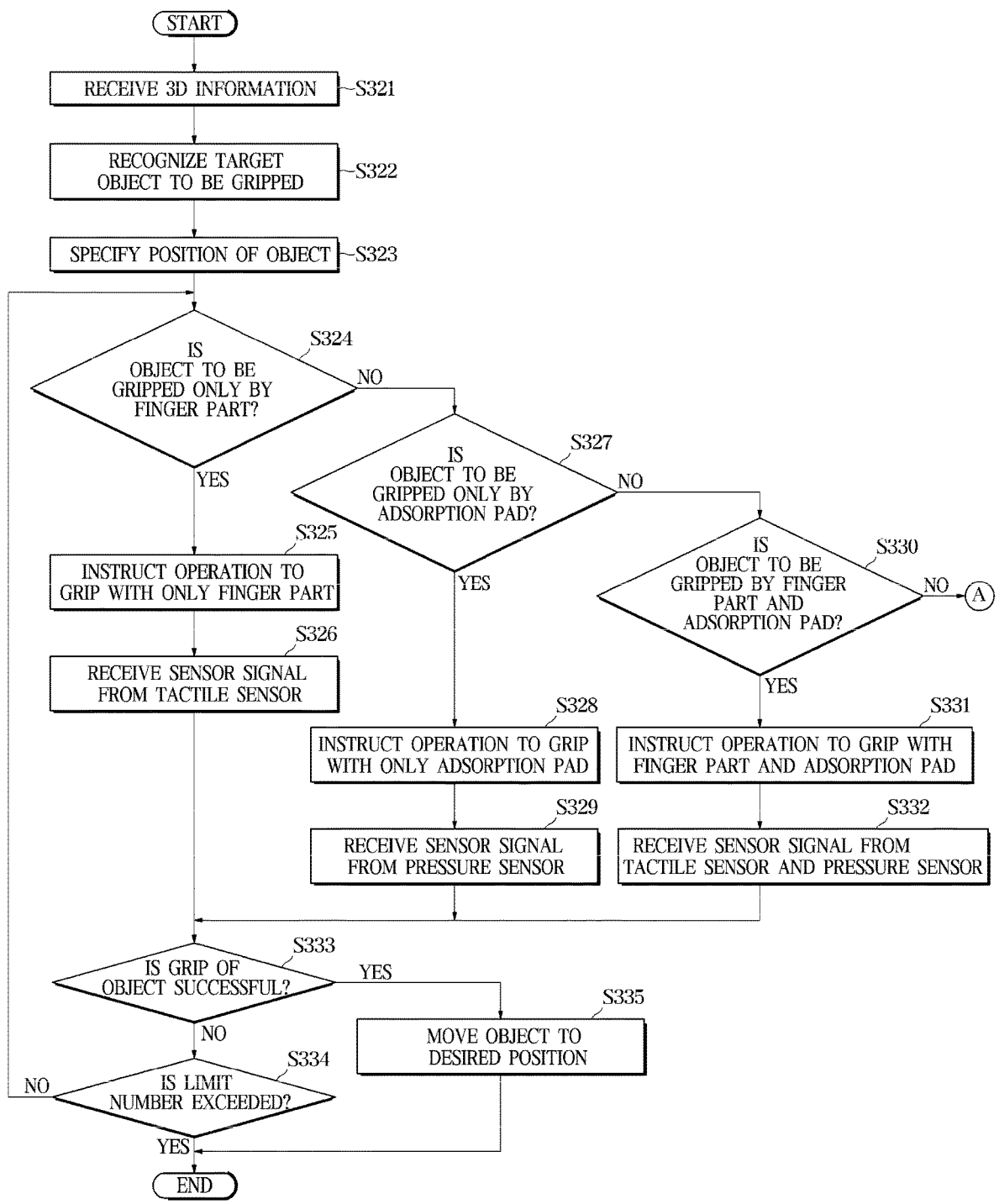
FIG. 6A is a flowchart illustrating operation of a robot, according to an embodiment.
Figure 6B:
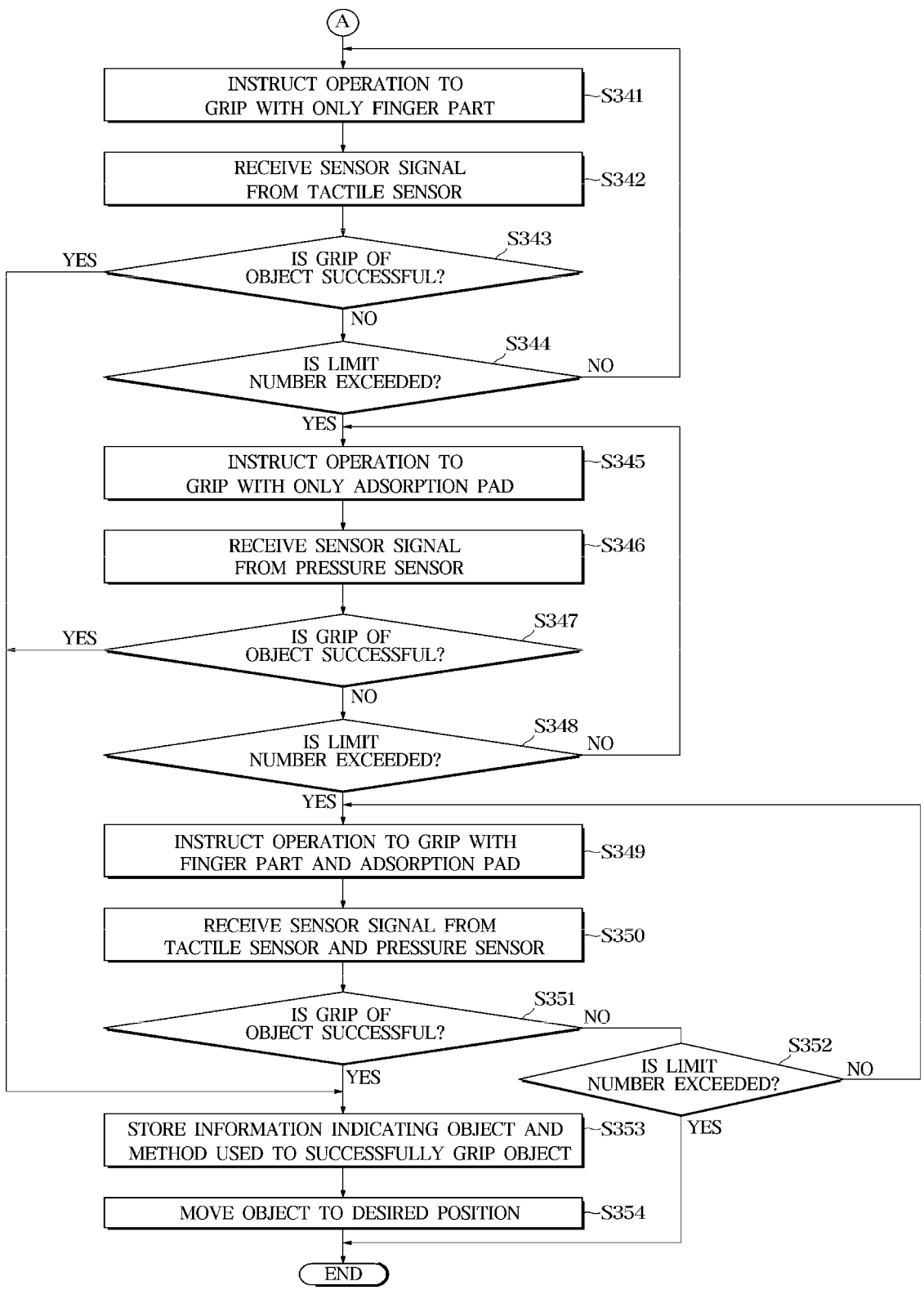
FIG. 6B is a flowchart illustrating operation of a robot, according to an embodiment.

FIGS. 6A and 6B are flowcharts illustrating operation of the controller 300 of the robot 10, according to an embodiment.

Referring to FIG. 6A, the controller 300 controls the 3D information processor 311 to receive 3D information from the 3D information acquirer 150, in operation S321. The 3D information processor 311 then recognizes an object, which is a target to be gripped, in operation S322 by processing the 3D information received in the operation S321. The 3D information processor 311 specifies a position of the object recognized in operation S322 based on the 3D information received in the operation S321, in operation S323.

Subsequently, the determiner 313 determines whether the object recognized in the operation S322 is an object to be gripped only with the finger part 241, based on information stored in the storage 312, in operation S324.

When it is determined in the operation S324 that the object recognized in the operation S322 is the object to be gripped only with the finger part 241 based on information stored in the storage 312, the operation instructor 314 instructs the hand part 200 to perform a gripping operation only with the finger part 241, in operation S325. Specifically, the operation instructor 314 instructs the motor 211 to perform an operation of opening or closing the first link 231 and the second link 232 and an operation of bending the third link 233 inward.

Accordingly, the sensor signal processor 315 receives tactile information, which is a sensor signal, from the tactile sensor 243, in operation S326.

On the other hand, when it is determined in the operation S324 that the object recognized in the operation S322 is not the object to be gripped only with the finger part 241, the determiner 313 determines whether the object is an object to be gripped only with the adsorption pad 251, based on information stored in the storage 312, in operation S327.

When it is determined in the operation S327 that the object recognized in the operation S322 is the object to be gripped only with the adsorption pad 251, based on information stored in the storage 312, the operation instructor 314 instructs the hand part 200 to perform a gripping operation only with the adsorption pad 251, in operation S328. Specifically, the operation instructor 314 instructs the adsorption pump 252 to vacuum the air of the inside of the adsorption pad 251.

Accordingly, the sensor signal processor 315 receives pressure information, which is a sensor signal, from the pressure sensor 261, in operation S329.

On the other hand, when it is determined in the operation S327 that the object recognized in the operation S322 is not the object to be gripped only with the adsorption pad 251, the determiner 313 determines whether the object is an object to be gripped with a complex operation using both the finger part 241 and the adsorption pad 251, based on information stored in the storage 312, in operation S330.

When it is determined in the operation S330 that the object recognized in the operation S322 is the object to be gripped by a complex operation using both the finger part 241 and the adsorption pad 251, based on information stored in the storage 312, the operation instructor 314 instructs the hand part 200 to perform a gripping operation with the complex operation using both the finger part 241 and the adsorption pad 251, in operation S331. Specifically, the operation instructor 314 instructs the motor 211 to perform an operation of opening or closing the first link 231 and the second link 232 and an operation of bending the third link 233 inward. In addition, the operation instructor 314 instructs the adsorption pump 252 to vacuum the air inside of the adsorption pad 251.

Accordingly, the sensor signal processor 315 receives tactile information and pressure information, which are sensor signals, from the tactile sensor 243 and the pressure sensor 261, respectively, in operation S332.

After this, the determiner 313 determines whether the grip of the object recognized in the operation S322 has been successful, in operation S333. Specifically, the determiner 313 performs the determination based on one of the tactile information received in the operation S326, the pressure information received in the operation S329, and the tactile information and the pressure information received in the operation S332.

As a result, when it is determined in the operation S333 that the grip of the object recognized in the operation S322 has not been successful, the determiner 313 determines whether a number of execution times of the gripping operation exceeds a limit number, in operation S334. When it is determined in the operation S334 that the number of execution times of the gripping operation does not exceed the limit number, the determiner 313 makes the process go back to the operation S324 to repeat the process until the operation S333.

On the other hand, when it is determined in the operation S333 that the grip of the object has been successful, the operation instructor 314 instructs the arm part 100, the hand part 200, and the like, to move the object gripped to a desired position, in operation S335. The position to be moved to may be registered in advance e.g., for each type of object. The controller 300 then ends the process.

When the number of execution times of the gripping operation is determined in the operation S334 to exceed the limit number, the controller 300 ends the process.

A case that it is not determined in the operation S330 that the object recognized in the operation S322 is an object to be gripped with the complex operation using both the finger part 241 and the adsorption pad 251 will now be described. That is, a case that the object recognized in the operation S322 has no corresponding information stored in the storage 312 will now be described.

In this case, as shown in FIG. 6B, the operation instructor 314 instructs the hand part 200 to perform the gripping operation only with the finger part 241, in operation S341. Specifically, the operation instructor 314 instructs the motor 211 to perform an operation of opening or closing the first link 231 and the second link 232 and an operation of bending the third link 233 inward.

Accordingly, the sensor signal processor 315 receives tactile information, which is a sensor signal, from the tactile sensor 243, in operation S342.

After this, the determiner 313 determines whether the grip of the object recognized in the operation S322 has been successful, in operation S343. Specifically, the determiner 313 makes the determination based on the tactile information received in the operation S342.

As a result, when it is determined in the operation S343 that the grip of the object recognized in the operation S322 has not been successful, the determiner 313 determines whether a number of execution times of the gripping operation exceeds a limit number, in operation S344. When it is determined in the operation S344 that the number of execution times of the gripping operation does not exceed the limit number, the determiner 313 makes the process go back to the operation S341 to repeat the process until the operation S343.

On the other hand, when it is determined in the operation S344 that the number of execution times of the gripping operation exceeds the limit number, the operation instructor 314 instructs the hand part 200 to perform the gripping operation only with the adsorption pad 251, in operation S345. Specifically, the operation instructor 314 instructs the adsorption pump 252 to vacuum the air inside of the adsorption pad 251.

Accordingly, the sensor signal processor 315 receives pressure information, which is a sensor signal, from the pressure sensor 261, in operation S346.

After this, the determiner 313 determines whether the grip of the object recognized in the operation S322 has been successful, in operation S347. Specifically, the determiner 346 makes the determination based on the pressure information received in the operation S342.

As a result, when it is determined in the operation S347 that the grip of the object recognized in the operation S322 has not been successful, the determiner 313 determines whether a number of execution times of the gripping operation exceeds a limit number, in operation S348. When it is determined in the operation S348 that the number of execution times of the gripping operation does not exceed the limit number, the determiner 313 makes the process go back to the operation S345 to repeat the process until the operation S347.

On the other hand, when it is determined in the operation S348 that the number of execution times of the gripping operation exceeds the limit number, the operation instructor 314 instructs the hand part 200 to perform the gripping operation with a complex operation using both the finger part 241 and the adsorption pad 251, in operation S349. Specifically, the operation instructor 314 instructs the motor 211 to perform an operation of opening or closing the first link 231 and the second link 232 and an operation of bending the third link 233 inward. In addition, the operation instructor 314 instructs the adsorption pump 252 to vacuum the air inside of the adsorption pad 251.

Accordingly, the sensor signal processor 315 receives tactile information and pressure information, which are sensor signals, from the tactile sensor 243 and the pressure sensor 261, respectively, in operation S350.

After this, the determiner 313 determines whether the grip of the object recognized in the operation S322 has been successful, in operation S351. Specifically, the determiner 350 makes the determination based on the tactile information and the pressure information received in the operation S350.

As a result, when it is determined in the operation S351 that the grip of the object recognized in the operation S322 has not been successful, the determiner 313 determines whether a number of execution times of the gripping operation exceeds a limit number, in operation S352. When it is determined in the operation S352 that the number of execution times of the gripping operation does not exceed the limit number, the determiner 313 makes the process go back to the operation S349 to repeat the process until the operation S351.

On the other hand, when it is determined in the operation S343, S347 or S351 that the grip of the object recognized in the operation S322 has been successful, the determiner 313 stores information indicating the method successfully used to grip the object in the storage 312, in operation S353.

Specifically, when determining that the operation performed to grip the object only with the finger part 241 in the operation S341 has been successful in the operation S343, the determiner 313 stores information indicating the object in the storage 312 as an object to be gripped only by the finger part 241. Furthermore, when determining that the operation performed to grip the object only with the adsorption pad 251 in the operation S345 has been successful in the operation S347, the determiner 313 stores information indicating the object in the storage 312 as an object to be gripped only by the adsorption pad 251. In addition, when determining that the operation performed to grip the object through a complex operation using both the finger part 241 and the adsorption pad 251 in the operation S349 has been successful in the operation S351, the determiner 313 stores information indicating the object in the storage 312 as an object to be gripped through the complex operation using both the finger part 241 and the adsorption pad 251.

Subsequently, the operation instructor 314 instructs the arm part 100, the hand part 200, and the like, to move the object gripped to a desired position, in operation S354. The position to be moved to may be registered in advance e.g., for each type of object. The controller 300 then ends the process.

In the case that the number of execution times of the gripping operation is determined in the operation S352 to exceed the limit number, the controller 300 ends the process.

Figure 7A:
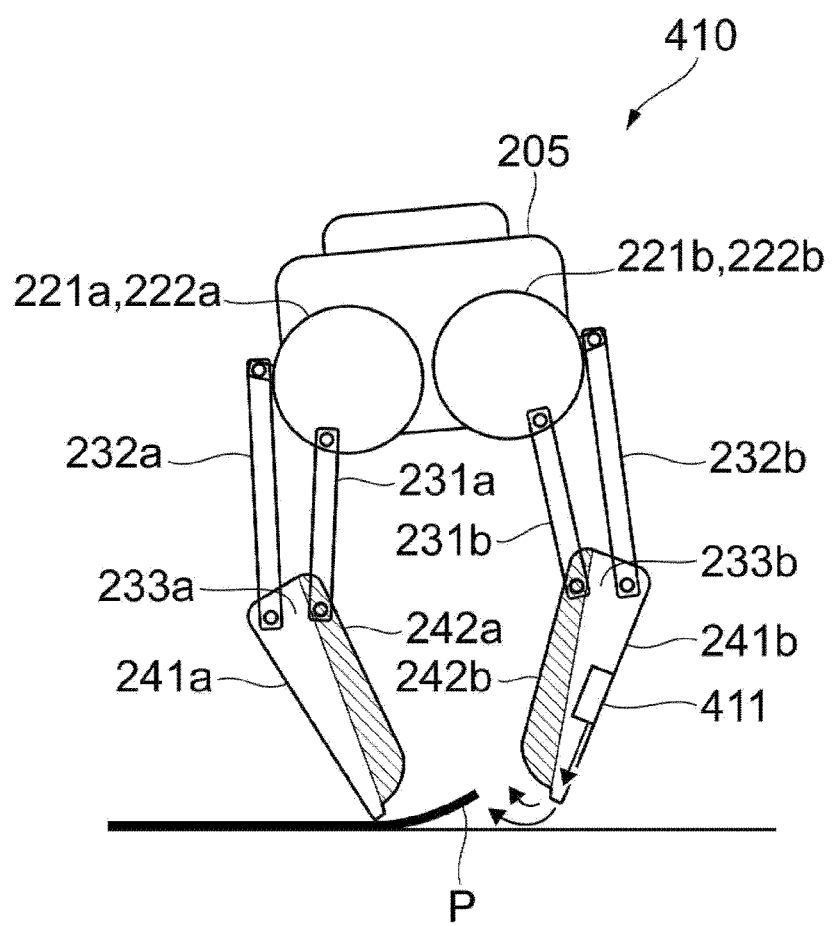
FIGS. 7A and 7B are diagrams of a hand part, according to an embodiment.
Figure 7B:
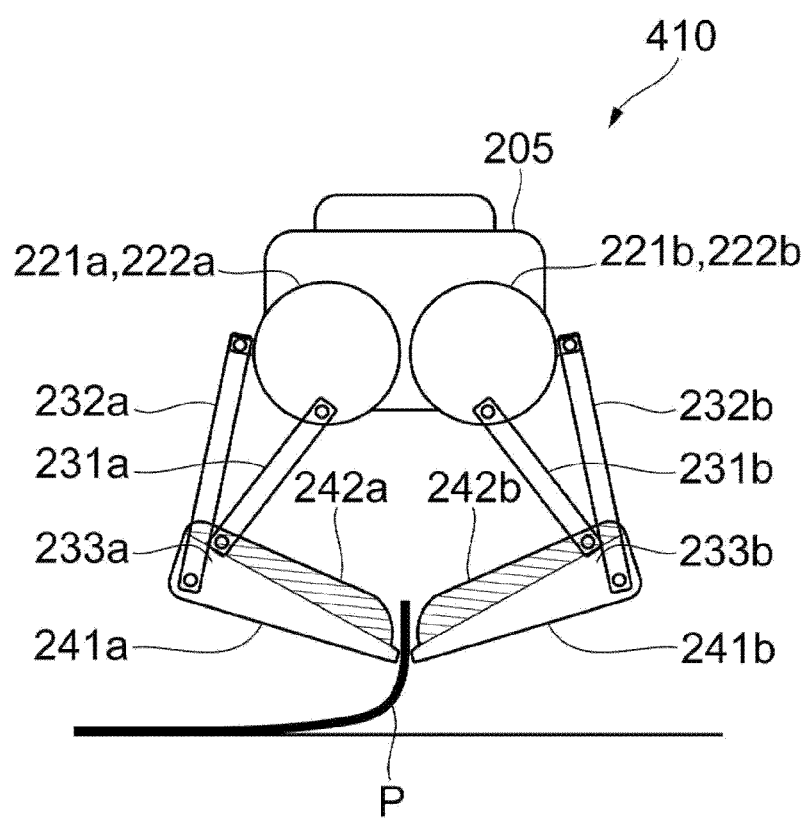

FIGS. 7A and 7B are diagrams for describing a hand part 410, according to an embodiment. As shown, the hand part 410 includes two fingers.

According to an embodiment, the hand part 410 differs from the hand part 200 in that the adsorption pads 251a and 251b are removed from the finger parts 241a and 241b and a blower mechanism 411 is provided in at least one finger part 241. The blower mechanism 411 (i.e., a fan and nozzle) is arranged in the finger part 241b, for example.

For example, as shown in FIG. 7A, when there is an object P such as cloth or paper lying on the floor, and the blower mechanism 411 blows air as represented with arrows while the finger part 241a presses the object P, a side of the object P is turned over by the wind. The finger part 241b then pushes the object P from the opposite side of the finger part 241a, thereby gripping the object P, as shown in FIG. 7B.

Although the adsorption pad 251 is removed from both the finger parts 241a and 241b, embodiments are not limited thereto. For example, one of the finger parts 241a and 241b has the adsorption pad 251.

Figure 8A:
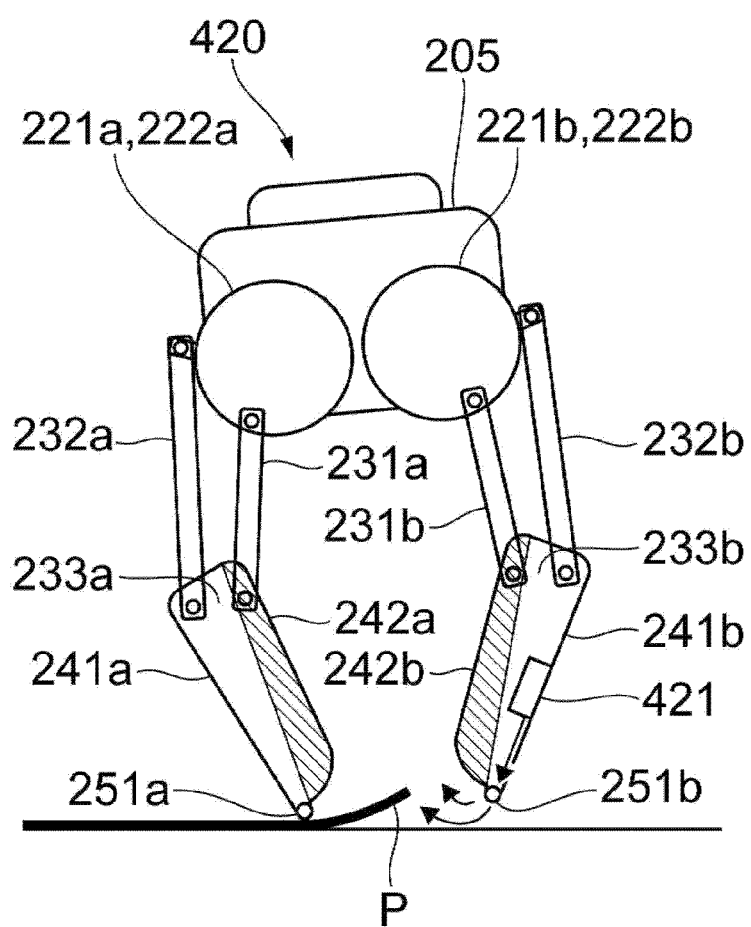
FIGS. 8A, 8B and 8C are diagrams of a hand part, according an embodiment.
Figure 8B:
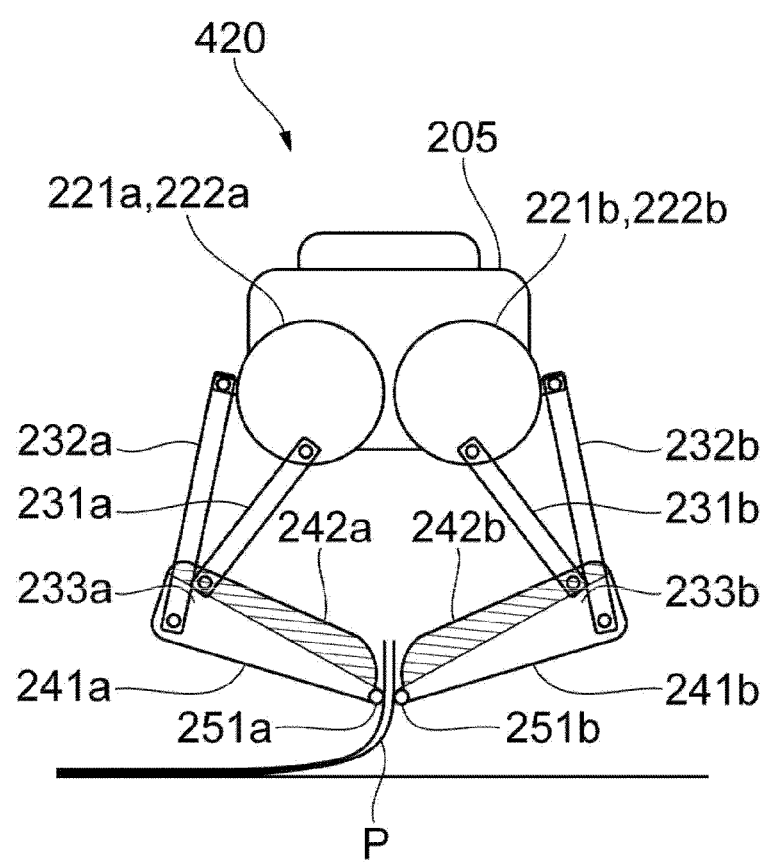
Figure 8C:
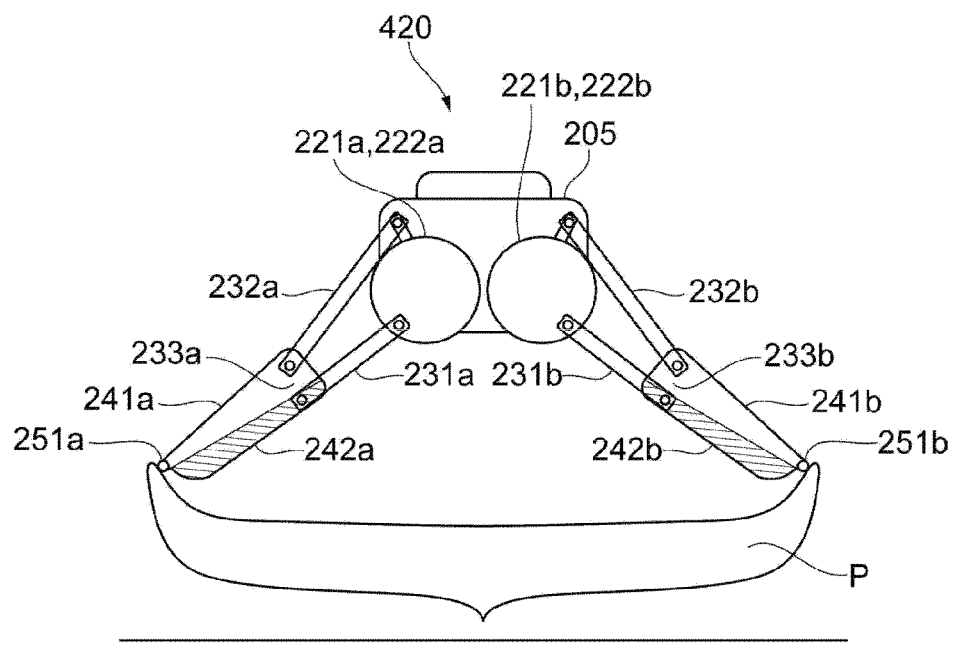

FIGS. 8A, 8B and 8C are diagrams for describing a hand part 420, according to an embodiment. The hand part 420 illustrated includes two fingers.

According to an embodiment, the hand part 420 differs from the hand part 200 in that a blower mechanism 421 (i.e., a fan and nozzle) is added in at least one finger part 241. The blower mechanism 421 is added in the finger part 241b, for example.

For example, as shown in FIG. 8A, when there is the object P such as a plastic bag lying on the floor, and the blower mechanism 421 blows air as represented with arrows while the adsorption pad 251a of the finger part 241a adsorbs the object P, a side of the object P is turned over by the wind. The adsorption pad 251b of the finger part 241b then adsorbs the object P on the opposite side of the adsorption pad 251a of the finger part 241a, thereby gripping the object P, as shown in FIG. 8B. After this, as shown in FIG. 8C, the object P may be opened by moving the first links 231a and 231b, the second links 232a and 232b, and the third links 233a and 233b to open the finger parts 241a and 241b.

Figure 9:
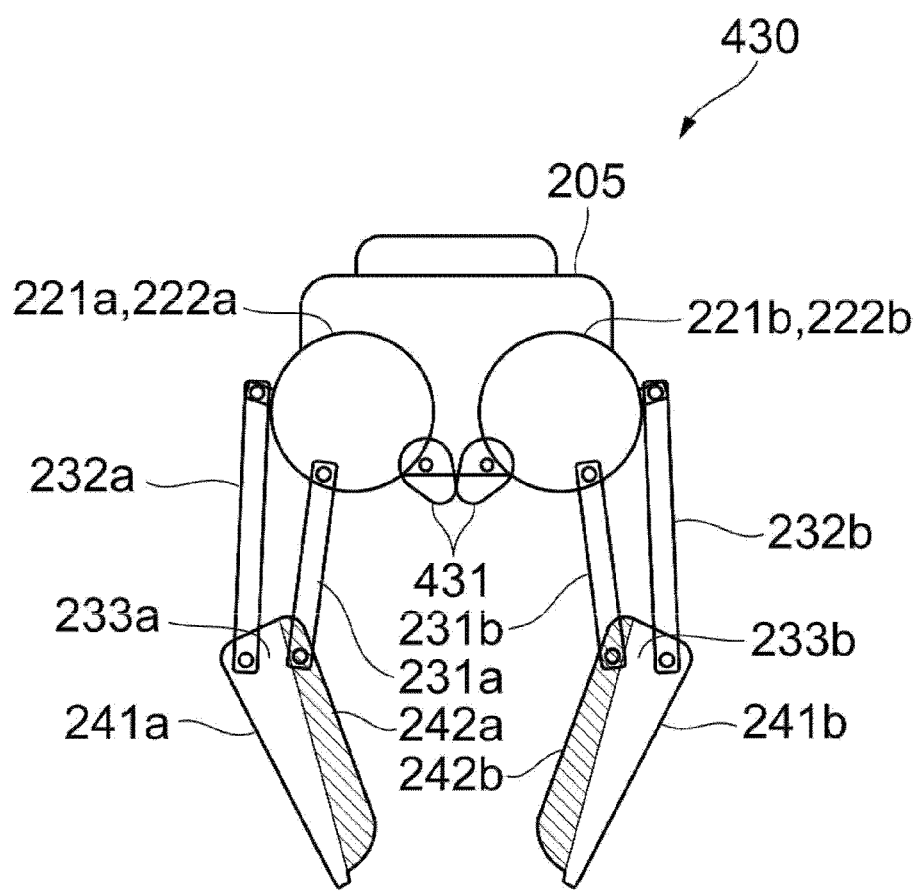
FIG. 9 is a diagram of a hand part, according to an embodiment.

FIG. 9 is a diagram for describing a hand part 430, according to an embodiment. The hand part 430 illustrated includes two fingers. The adsorption pad 251 is hidden in FIG. 9.

According to an embodiment, the hand part 430 differs from the hand part 200 in that a clipper 431 is provided to temporarily fasten an object to the base 205.

For example, in a case of gripping a plate, the plate may be lifted with high force of fingers by holding and dragging the plate with the finger parts 241a and 241b first, fixing edges of the plate with the clipper 431, and gripping the entire body of the plate with the whole fingers. Furthermore, it is also possible to set the plate on edge into a receiving place by pushing the plate, the edge of which is fastened by the clipper 431, or dropping the plate by gravity, from the clipper 431.

Figure 10A:
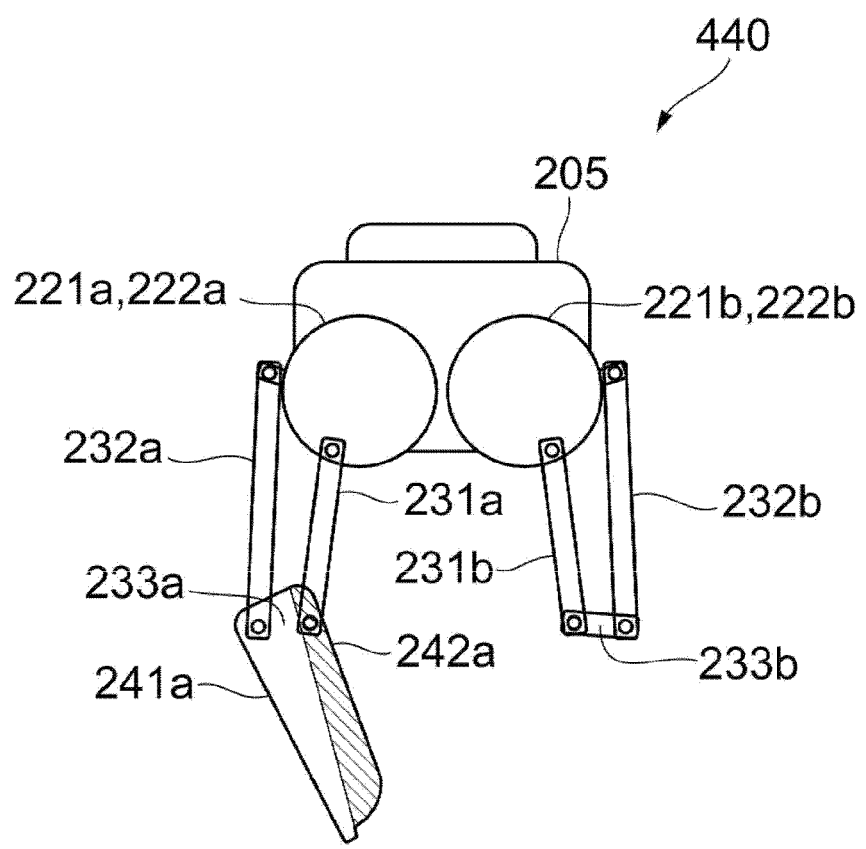
FIGS. 10A and 10B are diagrams of a hand part, according to an embodiment.
Figure 10B:
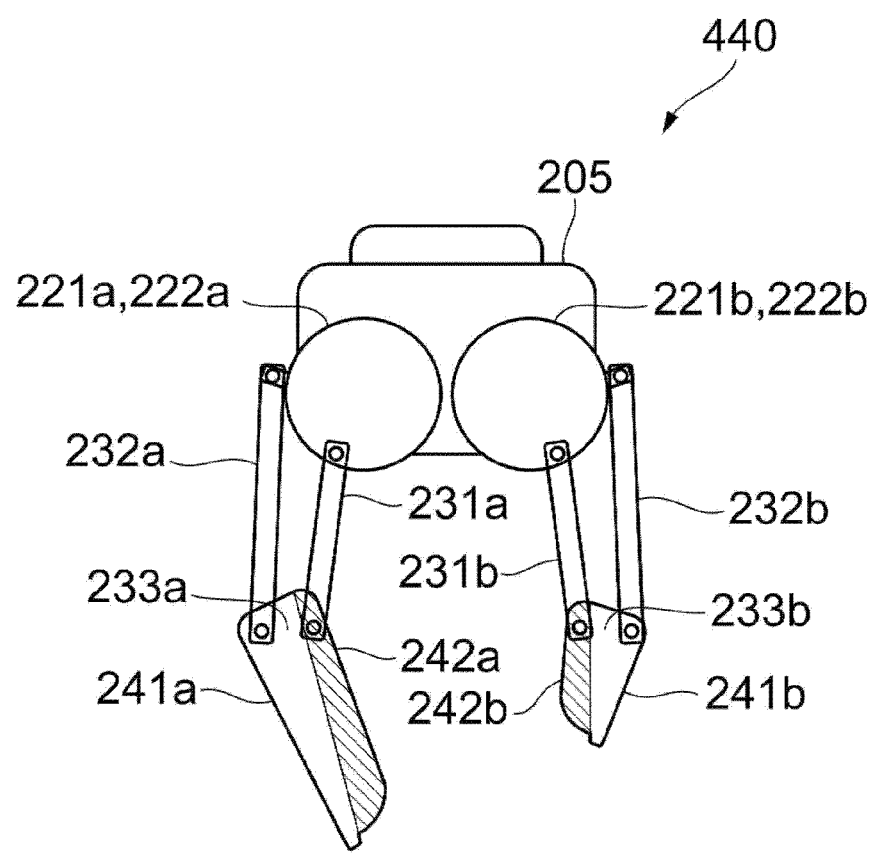

FIGS. 10A and 10B are diagrams for describing a hand part 440, according to an embodiment. The hand part 440 illustrated includes two fingers. The adsorption pad 251 is hidden in FIG. 9.

According to an embodiment, the hand part 440 differs from the hand part 200 in that one of the two finger parts is shorter than the other. Specifically, the hand part 440 of FIG. 10A corresponds to the hand part 200 with the finger part 241b removed therefrom. The hand part 440 of FIG. 10B corresponds to the hand part 200 with the finger part 241b of reduced size.

For example, in a case of gripping a plate, it is possible to push the short finger into a space under the plate. Furthermore, it is also possible to grip the plate with high force by pushing the short finger under the plate to grip the plate.

Figure 11A:
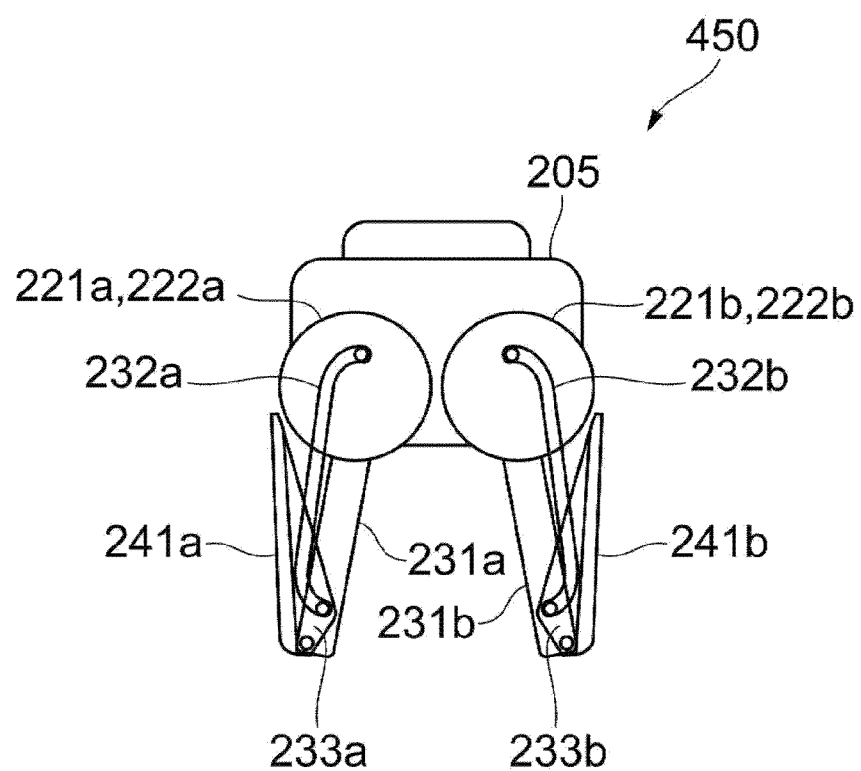
FIGS. 11A and 11B are diagrams of a hand part, according to an embodiment.
Figure 11B:
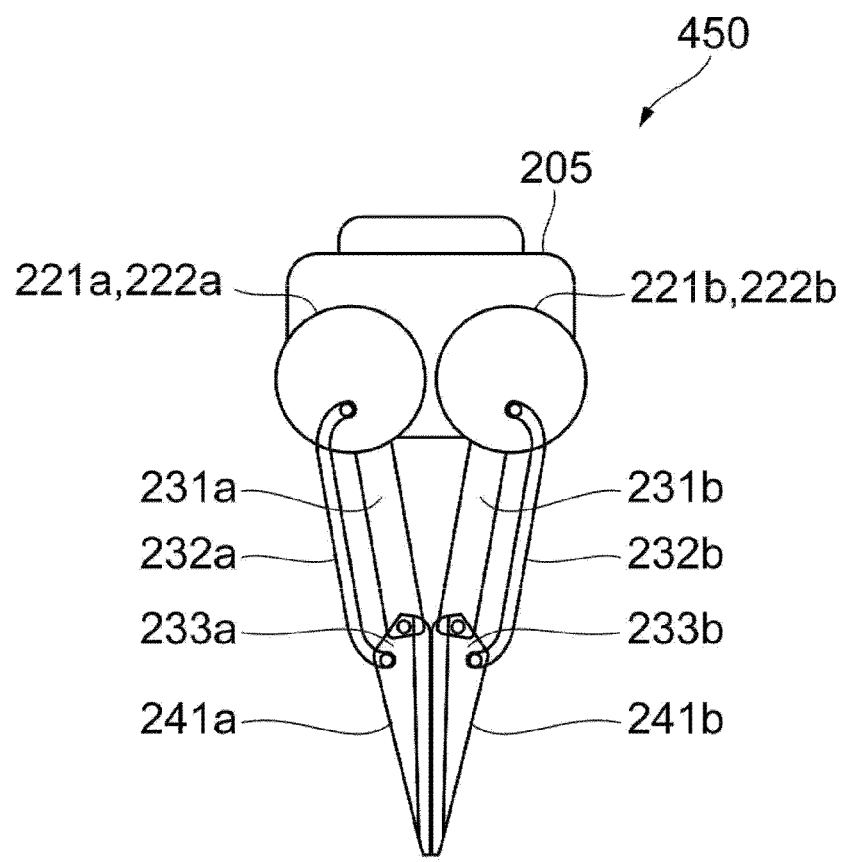

FIGS. 11A and 11B are diagrams for describing a hand part 450, according to an embodiment. The hand part 450 illustrated includes two fingers. The adsorption pad 251 is hidden in FIG. 9.

According to an embodiment, the hand part 450 differs from the hand part 200 in that lengths of the finger parts may be lengthened or shortened. In FIG. 11A, the fingers become shortened by bending the finger parts 241a and 241b of the hand part 450 outward. It is an example of a state in which the finger parts are bent toward the first and second links. In FIG. 11B, the finger parts 241a and 241b of the hand part 450 become lengthened by extending. It is an example of a state in which the finger parts 241a and 241b stretch to the opposite side of the first and second links. According to an embodiment, the hand part 450 has the second links 232a and 232b curved outward to be able to bend the finger parts 241a and 241b outward.

For example, when a plate is gripped in the state of FIG. 11A, there is a weakness that the plate is easily rotated under small fractional force, but the plate may be gripped with high torque. On the other hand, when the plate is gripped in the state of FIG. 11B, the frictional force increases, making it difficult for the plate to be rotated.

Although the finger parts 241a and 241b may be provided as bendable, embodiments are not limited thereto. For example, only one of the finger parts 241a and 241b may be arranged to be bendable.

Figure 12A:
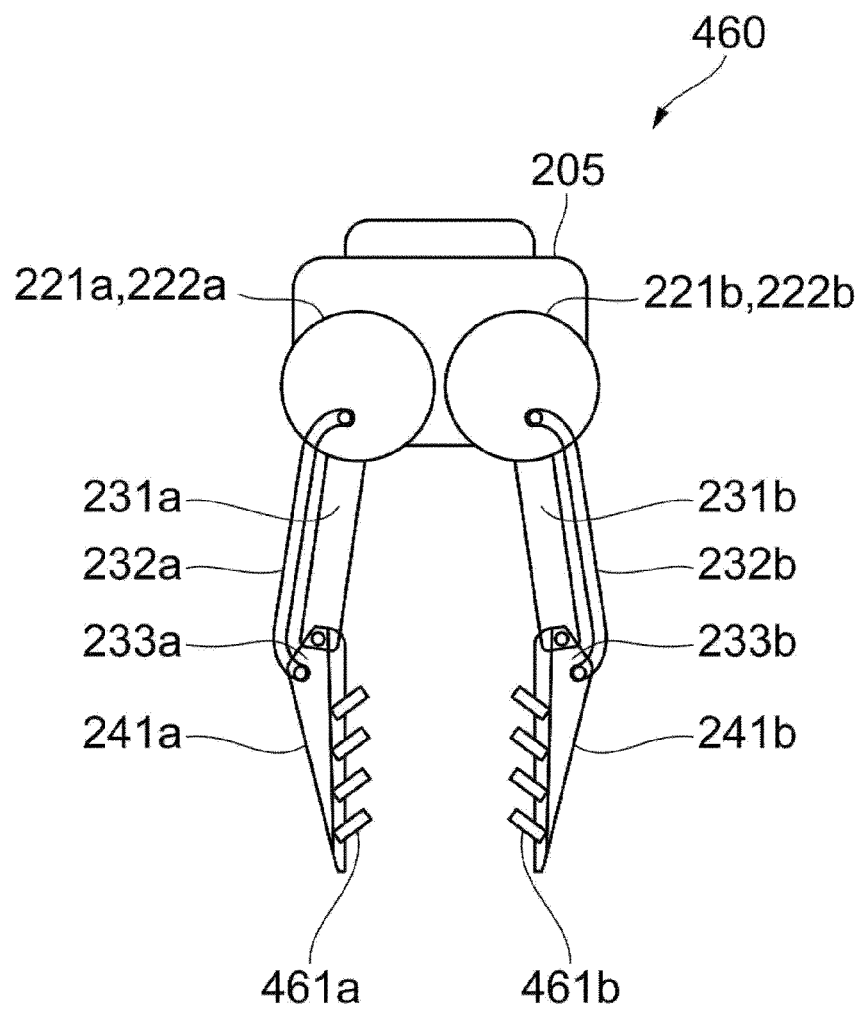
FIGS. 12A and 12B are diagrams of a hand part, according to an embodiment.
Figure 12B:
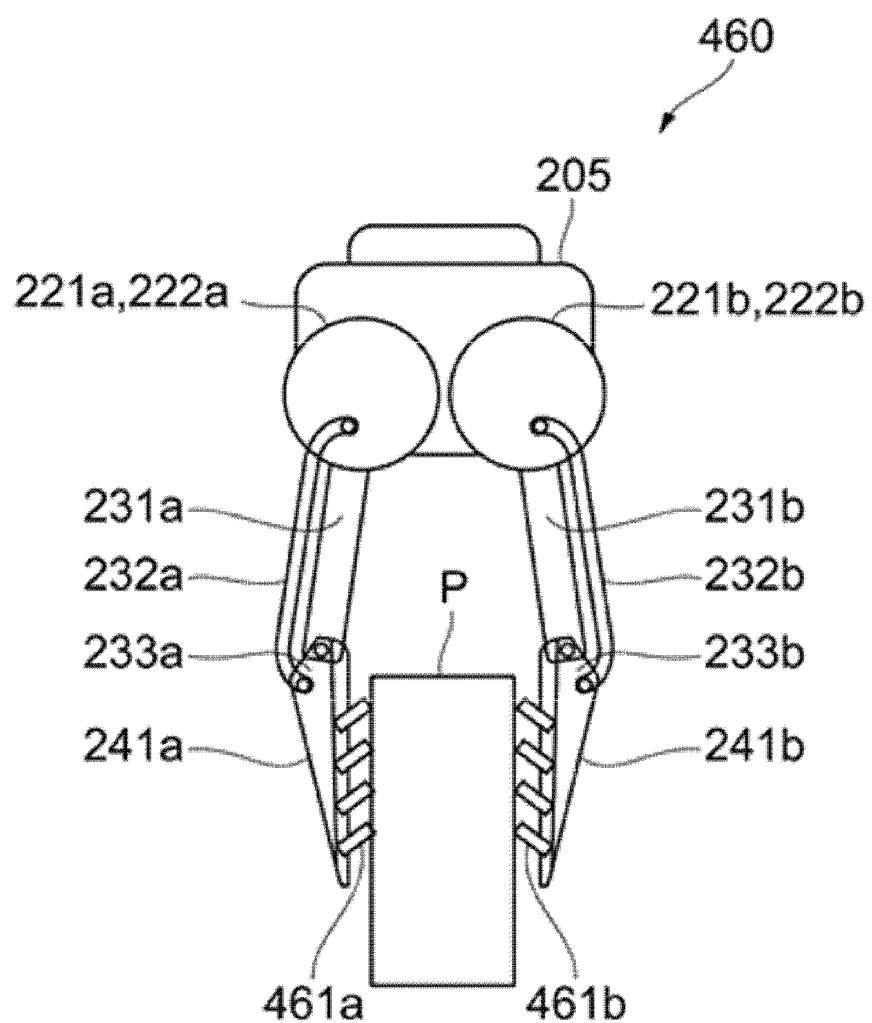

FIGS. 12A and 12B are diagrams for describing a hand part 460, according to an embodiment. The hand part 460 illustrated includes two fingers. The adsorption pad 251 is hidden in FIG. 9.

According to an embodiment, the hand part 460 differs from the hand part 200 in that stoppers 461a and 461b are provided at the finger parts 241a and 241b. In FIG. 12A, a state before the hand part 460 grips an object is illustrated. In FIG. 12B, a state when the hand part 460 grips an object P is illustrated. The stoppers 461a and 461b prevent the object P from falling by supporting the object P, for example in the opposite direction of the gravity.

For example, in a case of gripping an object having a curved shape such as edges of a tea cup, the stoppers 461a and 461b, when made of soft materials, are bent along the form of the object, so that the finger parts 241a and 241b are able to fix and grip the object.

Although it is described the stoppers 461a and 461b are provided at the finger parts 241a and 241b, respectively, embodiments are not limited thereto. Alternatively, a structure in which the stopper 461a is arranged at the finger part 241a and the stopper 461b is arranged at the finger part 241b may be employed, or a structure in which the stopper 461a is not arranged at the finger part 241a but the stopper 461b is arranged at the finger part 241b may be employed.

Figure 13A:
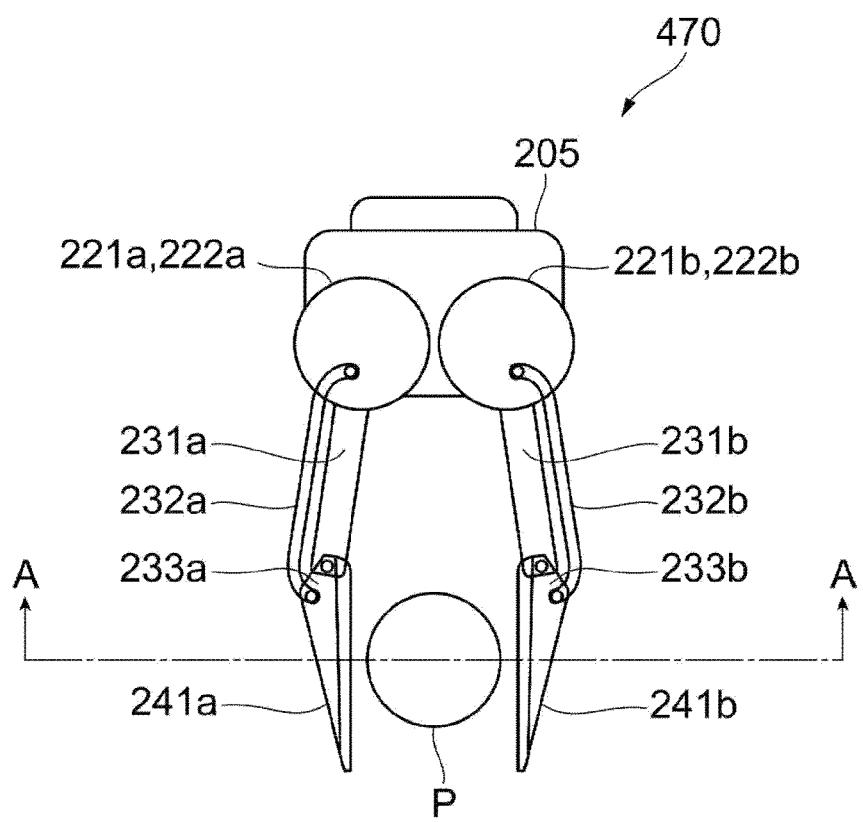
FIGS. 13A, 13B and 13C are diagrams of a hand part, according to an embodiment.
Figure 13B:
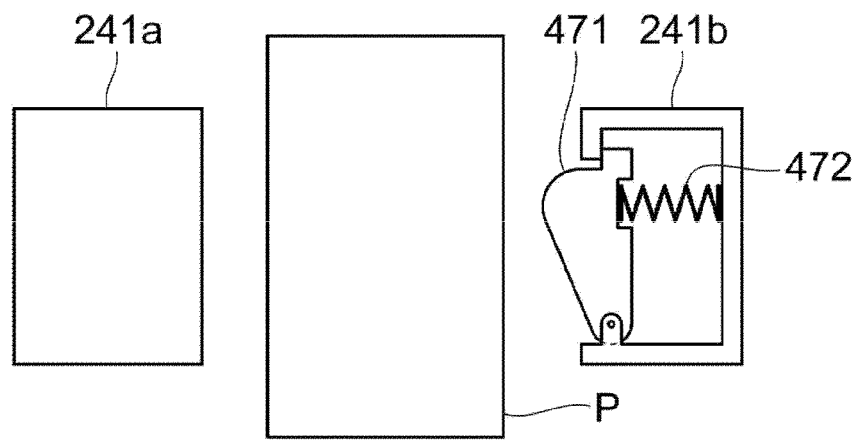
Figure 13C:
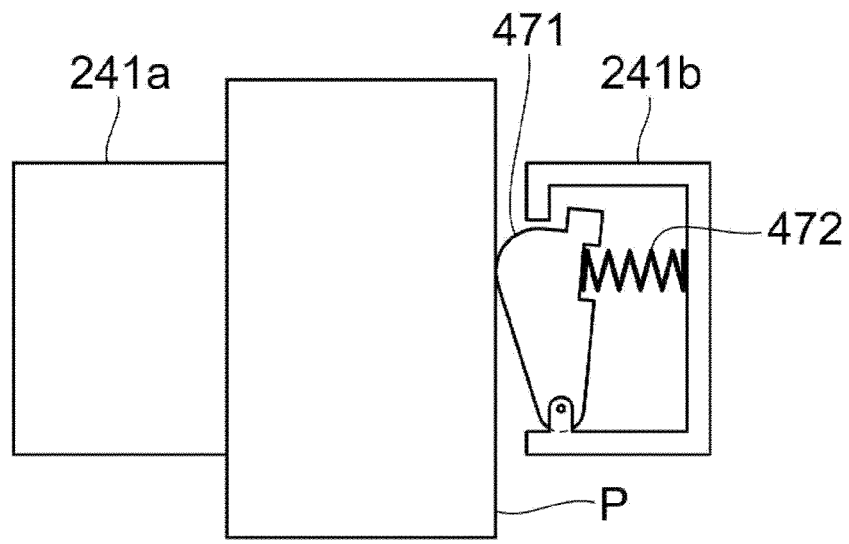

FIGS. 13A, 13B and 13C are diagrams for describing a hand part 470, according to an embodiment. The hand part 470 illustrated includes two fingers. The adsorption pad 251 is hidden in FIG. 9.

According to an embodiment, the hand part 470 differs from the hand part 200 in that a stopper 471 is arranged at the finger part 241. While the stoppers 461a and 461b are arranged on the outside of the finger part 241 in the hard part 460, the stopper 471 of the hand part 470 is arranged to spring out from the inside of the finger part 241. The stopper 471 may be arranged at all the finger parts 241a and 241b, but is shown only at the finger part 241b as an example.

In FIG. 13A, a state in which the hand part 470 is about to grip the object P such as a plastic bottle is illustrated. In FIG. 13B, a state before the object P is gripped is illustrated in a cross-sectional view along line A-A' of FIG. 13A. In this state, the finger part 241a and the stopper 471 of the finger part 241b do not yet contact the object P. In FIG. 13C, a state when the object P is gripped is illustrated in a cross-sectional view along line A-A' of FIG. 13A. In this state, the finger part 241a and the stopper 471 of the finger part 241b contact the object P. Accordingly, the stopper 471 prevents falling of the object P by pressing the object P with the force of a spring 472.

According to embodiments, a robot hand has a structure in which a gear on one side is engaged with a link on the one side and a corresponding link on another side, and a gear on the other side is engaged with a link on the other side and a corresponding link on the one side. With the structure, the robot hand is able to open and close two links on one side and two links on the other side and at the same time, synchronously operate a link connecting the two links on the one side and a link connecting the two links on the other side.

According to the disclosure, a robot hand is able to open or close two links on one side and two links on the other side while synchronously operating a link connecting the two links on the one side and a link connecting the two links on the other side.

While embodiments have been particularly shown and described, it will be understood that various changes in form and details may be made therein without departing from the spirit and scope of the following claims.

What is claimed is:

1. A robot hand comprising:
 a first drive gear on a first side configured to be rotated by a first actuator on the first side;

a second drive gear on a second side configured to be rotated by a second actuator on the second side;

a first interlocked gear on the first side interlocked with the second drive gear so that the first interlocked gear and the second drive gear rotate in opposite directions;

a second interlocked gear on the second side interlocked with the first drive gear so that the second interlocked gear and the first drive gear rotate in opposite directions;

a first inner link on the first side engaged with rotation of the first drive gear;

a first outer link on the first side engaged with rotation of the first interlocked gear;

a first end link on the first side connected to the first inner link and the first outer link opposite the first actuator;

a second inner link on the second side engaged with rotation of the second interlocked gear;

a second outer link on the second side engaged with rotation of the second drive gear; and a second end link on the second side connected to the second inner link and the second outer link opposite the second actuator.

2. The robot hand of claim 1, further comprising a controller configured to:

control the first inner link, the second inner link, the first outer link and the second outer link to perform an opening or closing operation by simultaneously operating the first actuator and the second actuator; and control the first outer link, the second outer link, the first end link and the second end link to be synchronously operated by deactivating the first actuator and actuating the second actuator.

3. The robot hand of claim 1, further comprising a first finger portion on the first side connected to the first end link.

4. The robot hand of claim 3, wherein the first finger portion extends away from the first inner link and the first outer link and are configured to bend inward toward the first inner link.

5. The robot hand of claim 3, wherein the first finger portion comprises a stopper configured to grip an object.

6. The robot hand of claim 3, further comprising a second finger portion on the second side connected to the second end link.

7. The robot hand of claim 6, wherein the second finger portion comprises a blower configured to blow air towards an object fastened by the first finger portion.

8. The robot hand of claim 6, further comprising a clipper arranged between the first finger portion and the second finger portion.

9. The robot hand of claim 6, wherein the second finger portion is shorter than the first finger portion.

10. The robot hand of claim 6, further comprising:

a first adsorption portion on the first side arranged on the first finger portion; and a second adsorption portion on the second side arranged on the second finger portion.

11. The robot hand of claim 10, further comprising a third adsorption portion arranged between the first finger portion and the second finger portion.

12. The robot hand of claim 1, further comprising:

any one or any combination of a first finger portion on the first side connected to the first end link or a second finger portion on the second side connected to the second end link; and any one or any combination of a first adsorption portion arranged on the first finger portion, a second adsorption portion arranged on the second finger portion, and a third adsorption portion arranged between the first finger portion and the second finger portion.

13. The robot hand of claim 12, further comprising a controller configured to:

recognize an object;

identify whether a finger gripping method is stored in a memory in association with the object;

control the first finger portion to grip the object when the finger gripping method is stored in the memory in association with the object;

identify whether an adsorption gripping method is stored in the memory in association with the object; and control the first adsorption portion to grip the object when the adsorption gripping method is stored in the memory in association with the object.

14. The robot hand of claim 13, wherein the controller is configured to:

identify whether a combination gripping method is stored in the memory in association with the object; and control any one or any combination of the first finger portion or the second finger portion to grip the object in combination with any one or any combination of the first adsorption portion or the second adsorption portion when the combination gripping method is stored in the memory in association with the object.

15. The robot hand of claim 13, wherein the controller is configured to:

identify a gripping method is not stored in the memory in association with the object;

control any one or any combination of an operation to grip the object with the first finger portion or an operation to grip the object with the first adsorption portion based on no method of gripping the object being stored in the memory in association with the object;

register the finger gripping method in association with the object in the memory based on the operation to grip the object with the first finger portion being successful; and register the adsorption gripping method in association with the object in the memory based on the operation to grip the object with the first adsorption portion being successful.

16. A method of controlling a robot hand that includes a first actuator coupled to a first drive gear, a second actuator coupled to a second drive gear, a first interlocked gear interlocked with the second drive gear, and a second interlocked gear interlocked with the first drive gear, the method comprising:

identifying a first object;

positioning the robot hand with respect to the first object;

controlling a first inner link coupled to the first drive gear, a second inner link coupled to the second drive gear, a first outer link coupled to the first interlocked gear and a second outer link coupled to the second interlocked gear to perform a closing operation with respect to the first object by simultaneously operating the first actuator and the second actuator; and controlling a first end link connected to the first inner link and the first outer link, and a second end link connected to the second inner link and the second outer link, to be synchronously operated to grip the first object by deactivating the first actuator and actuating the second actuator.

17. The method of claim 16, wherein a first adsorption portion is provided on a first finger portion connected to the first inner link and the first outer link, and a second adsorption portion is provided on a second finger portion connected to the second inner link and the second outer link, and wherein the method further comprises:
identifying a second object;
positioning the robot hand with respect to the second object;
identifying a finger gripping method is not associated with the second object;
identifying an adsorption gripping method is associated with the second object; and
controlling the first adsorption portion and the second adsorption portion to grip the second object based on the adsorption gripping method being associated with the second object.

18. The method of claim 17, further comprising:
identifying a third object;
positioning the robot hand with respect to the third object;
identifying the finger gripping method is not associated with the third object;
identifying the adsorption gripping method is not associated with the third object;
identifying a combination gripping method is associated with the third object; and
controlling the first end link and the second end link to be synchronously operated to grip the third object by deactivating the first actuator, actuating the second actuator, and activating the first adsorption portion and the second adsorption portion, based on the combination gripping method being associated with the third object.

19. The method of claim 18, further comprising:
identifying a fourth object;
positioning the robot hand with respect to the fourth object;
identifying the finger gripping method is not associated with the fourth object;
identifying the adsorption gripping method is not associated with the fourth object;
identifying the combination gripping method is not associated with the fourth object;
controlling the first end link and the second end link to be synchronously operated to grip the fourth object by deactivating the first actuator and actuating the second actuator; and
associating the fourth object with the finger gripping method based on the first end link and the second end link gripping the fourth object.

20. The method of claim 19, further comprising:
identifying a fifth object;
positioning the robot hand with respect to the fifth object;
identifying the finger gripping method is not associated with the fifth object;
identifying the adsorption gripping method is not associated with the fifth object;
identifying the combination gripping method is not associated with the fifth object;
first attempting to grip the fifth object by controlling the first end link and the second end link to be synchronously operated to by deactivating the first actuator and actuating the second actuator; and
identifying the first attempting as unsuccessful;
second attempting to grip the fifth object by controlling the first adsorption portion and the second adsorption portion to grip the fifth object; and
associating the fifth object with the adsorption gripping method based on the first adsorption portion and the second adsorption portion gripping the fifth object.

21. A non-transitory computer readable recording medium having embodied thereon a program, which when executed by a processor causes the processor to execute a method that controls a robot hand that includes a first actuator coupled to a first drive gear, a second actuator coupled to a second drive gear, a first interlocked gear interlocked with the second drive gear, and a second interlocked gear interlocked with the first drive gear, wherein the method includes:
identifying a first object;
positioning the robot hand with respect to the first object;
controlling a first inner link coupled to the first drive gear, a second inner link coupled to the second drive gear, a first outer link coupled to the first interlocked gear and a second outer link coupled to the second interlocked gear to perform a closing operation with respect to the first object by simultaneously operating the first actuator and the second actuator; and
controlling a first end link connected to the first inner link and the first outer link, and a second end link connected to the second inner link and the second outer link, to be synchronously operated to grip the first object by deactivating the first actuator and actuating the second actuator.

* * * * *